US 11,405,577 B2

(12) United States Patent
Kawahito

(10) Patent No.: US 11,405,577 B2
(45) Date of Patent: Aug. 2, 2022

(54) DISTANCE IMAGE MEASUREMENT DEVICE AND DISTANCE IMAGE MEASUREMENT METHOD

(71) Applicant: NATIONAL UNIVERSITY CORPORATION SHIZUOKA UNIVERSITY, Shizuoka (JP)

(72) Inventor: Shoji Kawahito, Hamamatsu (JP)

(73) Assignee: NATIONAL UNIVERSITY CORPORATION SHIZUOKA UNIVERSITY

( * ) Notice: Subject to any disclaimer, the term of this patent is extended or adjusted under 35 U.S.C. 154(b) by 296 days.

(21) Appl. No.: 16/756,174

(22) PCT Filed: Oct. 19, 2018

(86) PCT No.: PCT/JP2018/039080
§ 371 (c)(1),
(2) Date: Apr. 15, 2020

(87) PCT Pub. No.: WO2019/078366
PCT Pub. Date: Apr. 25, 2019

(65) Prior Publication Data
US 2020/0278194 A1    Sep. 3, 2020

(30) Foreign Application Priority Data
Oct. 20, 2017 (JP) .............................. JP2017-203855

(51) Int. Cl.
*G01S 7/4861* (2020.01)
*H04N 5/369* (2011.01)
(Continued)

(52) U.S. Cl.
CPC ............. *H04N 5/379* (2018.08); *G01B 11/14* (2013.01); *G01S 7/4861* (2013.01); *G01S 17/89* (2013.01); *H04N 5/341* (2013.01)

(58) Field of Classification Search
CPC ........ H04N 5/379; H04N 5/341; H04N 5/225; H04N 5/369; G01B 11/14; G01S 7/4861;
(Continued)

(56) References Cited

U.S. PATENT DOCUMENTS 10,473,785 B2 * 11/2019 Kubota .................... G01S 17/42
2011/0157354 A1   6/2011 Kawahito ..................... 348/140
(Continued)

FOREIGN PATENT DOCUMENTS

EP      2322953 A1     5/2011
JP   2006-064641 A     3/2006
(Continued)

OTHER PUBLICATIONS

International Search Report dated Jan. 8, 2019 in corresponding PCT International Application No. PCT/JP2018/039080.
(Continued)

*Primary Examiner* — Jonathan M Hansen
(74) *Attorney, Agent, or Firm* — Ostrolenk Faber LLP

(57) ABSTRACT

A distance image sensor includes a light source that generates pulsed light, a light source control means for controlling the light source, a pixel circuit including a photoelectric conversion region, charge readout regions, a charge discharge region, and control electrodes, a charge transfer control means for sequentially applying a control pulse to the control electrodes, and a distance calculation means for reading voltages of the charge readout regions as detection signals and repeatedly calculating a distance on the basis of the detection signals, and the charge transfer control means sets timings of the control pulses so that delay times of the control pulses with respect to a generation timing of the pulsed light is shifted to a time differing between the four types of subframe periods in one frame period.

10 Claims, 18 Drawing Sheets

(51) Int. Cl.
    *G01B 11/14*     (2006.01)
    *G01S 17/89*     (2020.01)
    *H04N 5/341*     (2011.01)

(58) Field of Classification Search
    CPC .......... G01S 17/89; G01S 7/484; G01S 17/10; G01C 3/06
    See application file for complete search history.

(56) References Cited

U.S. PATENT DOCUMENTS

| | | | |
|---|---|---|---|
| 2018/0197274 A1* | 7/2018 | Price | H04N 5/332 |
| 2020/0243585 A1* | 7/2020 | Kawahito | G01S 17/10 |
| 2021/0250535 A1* | 8/2021 | Lee | H04N 13/271 |

FOREIGN PATENT DOCUMENTS

| | | |
|---|---|---|
| JP | 2010-032425 A | 2/2010 |
| WO | WO 2017/141957 A1 | 8/2017 |

OTHER PUBLICATIONS

International Preliminary Report on Patentability dated Apr. 23, 2020 in corresponding PCT International Application No. PCT/JP2018/039080 with English translation.
Chinese Office Action dated Oct. 8, 2021 in counterpart Chinese Patent Application No. 201880067356.3.

\* cited by examiner

DISTANCE IMAGE MEASUREMENT DEVICE AND DISTANCE IMAGE MEASUREMENT METHOD

CROSS-REFERENCE TO RELATED APPLICATIONS

The present application is a 35 U.S.C. §§ 371 national phase conversion of International Application No. PCT/JP2018/039080, filed Oct. 19, 2018, which claims priority to Japanese Patent Application No. 2017-203855, filed Oct. 20, 2017, the contents of both of which are incorporated herein by reference. The PCT International Application was published in the Japanese language.

TECHNICAL FIELD

An aspect of the present invention relates to a distance image measurement device and a distance image measurement method for generating a distance image including distance information for each pixel.

BACKGROUND ART

In the related art, a sensor device that generates an image signal including distance information using a time of flight of light has been used (see, for example, Patent Literature 1 below). This sensor irradiates a target with a sequence of first to fifth pulses as irradiation pulses in first to fifth frames arranged on a time axis, and generates an image signal including distance information of the target in a pixel array. With such a configuration, it is possible to expand a distance measurement range without degradation of a distance resolution.

CITATION LIST

Patent Literature
 [Patent Literature 1] Japanese Unexamined Patent Publication No. 2010-32425

SUMMARY OF INVENTION

Technical Problem

However, in the sensor device of the related art described above, there is room for improvement in order to further improve the distance resolution when an image signal including distance information of a target in various distance measurement ranges is to be generated.

An aspect of the present invention has been made in view of the above problem, and an object of the present invention is to provide a distance image measurement device and a distance image measurement method capable of generating an image signal with an improved distance resolution for a target in various distance measurement ranges.
Solution to Problem In order to solve the above problem, a distance image measurement device according to an aspect of the present invention includes a light source configured to generate pulsed light; a light source control means configured to control the light source so that the light source regularly and repeatedly generates the pulsed light with a first duration in first to N-th (N is an integer equal to or greater than 2) subframe periods included in one frame period; a pixel circuit part including a photoelectric conversion region configured to convert light into charge, first to M-th (M is an integer equal to or greater than 2) charge readout regions provided in proximity to the photoelectric conversion region and apart from each other, a charge discharge region for discharging the charge, and first to (M+1)-th control electrodes provided in correspondence to the photoelectric conversion region, the first to M-th charge readout regions, and the charge discharge region, for applying first to (M+1)-th control pulses for charge transfer between the photoelectric conversion region and the first to M-th charge readout regions, and charge transfer between the photoelectric conversion region and the charge discharge region, respectively; a charge transfer control means configured to sequentially apply the first to M-th control pulses to the first to M-th control electrodes during a second duration, the second duration being equal to or longer than the first duration, in correspondence to the generation of the pulsed light by the light source control means, and apply the (M+1)-th control pulse to the (M+1)-th control electrode during a period other than application periods of the first to M-th control pulses; a voltage detection means configured to read out voltages of the first to M-th charge readout regions of the pixel circuit part as first to M-th detection signals after the application of the first to M-th control pulses by the charge transfer control means; and a distance calculation means configured to repeatedly calculate a distance on the basis of the first to M-th detection signals, wherein the charge transfer control means sets timings of the first to M-th control pulses so that delay times of the first to M-th control pulses with respect to a generation timing of the pulsed light are shifted to a time differing between first to N-th (N is an integer equal to or greater than 2) subframe periods in one frame period.

Alternatively, a distance image measurement method according to another aspect of the present invention includes a light source control step of controlling, by a light source control means, a light source so that the light source regularly and repeatedly generates pulsed light with a first duration in first to N-th (N is an integer equal to or greater than 2) subframe periods included in one frame period; a charge transfer control step of sequentially applying, by a charge transfer control means, the first to M-th control pulses for controlling transfer of charge to the first to M-th control electrodes during a second duration, the second duration being equal to or longer than the first duration, in correspondence to the generation of the pulsed light by the light source control means, and applying an (M+1)-th control pulse for controlling discharge of the charge to the (M+1)-th control electrode during a period other than application periods of the first to M-th control pulses, by using a pixel circuit part including a photoelectric conversion region configured to convert light into charge, first to M-th (M is an integer equal to or greater than 2) charge readout regions provided in proximity to the photoelectric conversion region and apart from each other, a charge discharge region for discharging the charge, and first to (M+1)-th control electrodes provided in correspondence to the photoelectric conversion region, the first to M-th charge readout regions, and the charge discharge region; a voltage detection step of reading out, by a voltage detection means, voltages of the first to M-th charge readout regions of the pixel circuit part as first to M-th detection signals after the application of the first to M-th control pulses by the charge transfer control means; and a distance calculation step of repeatedly calculating, by a distance calculation means, a distance on the basis of the first to M-th detection signals, wherein the charge transfer control step includes setting timings of the first to M-th control pulses so that delay times of the first to M-th control pulses with respect to a generation timing of the pulsed light are shifted to a time differing between first to N-th (N is an integer equal to or greater than 2) subframe periods in one frame period.

According to the distance image measurement device or the distance image measurement method of the aspect, pulsed light is regularly and repeatedly generated from the light source within two or more subframe periods included in one frame period, the time window having the second duration equal to or longer than the duration of the pulsed light is sequentially set in correspondence to the generation of the pulsed light, the charge is sequentially transferred from the photoelectric conversion region of the pixel circuit part to the first to M-th charge readout regions in the time window, and the charge is discharged from the photoelectric conversion region during a period other than the time window. Further, the first to M-th detection signals are read out from the first to M-th charge readout regions of the pixel circuit part, and the distance is repeatedly calculated on the basis of the first to M-th detection signals. In this case, the delay time of the time window with respect to the generation timing of the pulsed light is set to be shifted to a time differing between two or more subframe periods. Thus, it is possible to detect charge using a large number of time windows having a small duty ratio by combining a shift of the time window in units of the pixel circuit parts with a shift of the time window between the subframes. As a result, even when a target in various distance measurement ranges is targeted, an influence of background light noise on the detection signal can be reduced, distance calculation with high distance resolution can be realized, and an error in the distance calculation due to saturation of the detection signal caused by strong background light can also be prevented.

Advantageous Effects of Invention

According to an aspect of the present invention, it is possible to generate an image signal with an improved distance resolution for a target in various distance measurement ranges.

DESCRIPTION OF EMBODIMENTS

Hereinafter, preferred embodiments of a distance image measurement device according to the present invention will be described in detail with reference to the drawings. In the description of the drawings, the same or corresponding parts will be denoted by the same reference signs and repeated description will be omitted.

Figure 1:
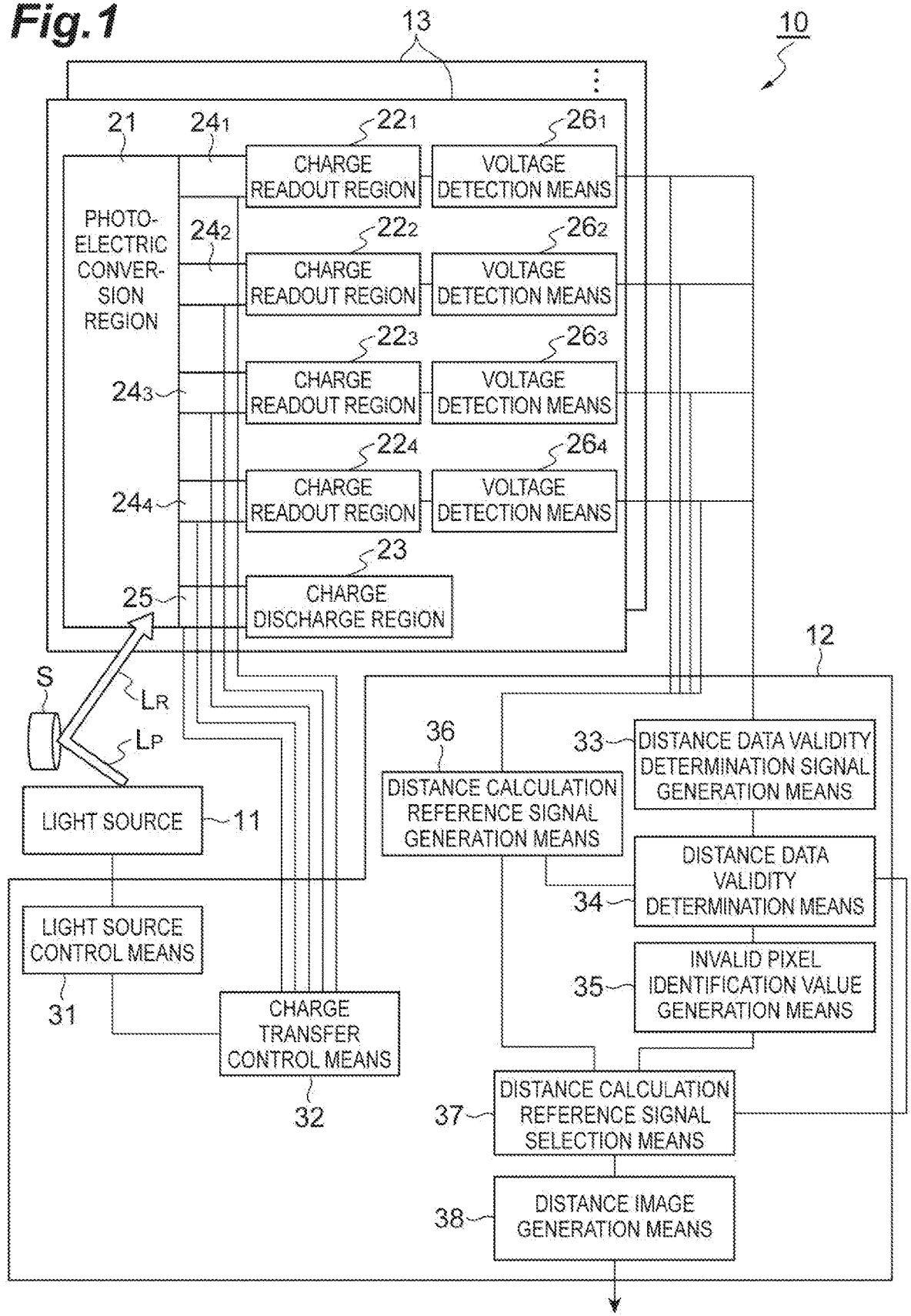
FIG. 1 is a block diagram illustrating a schematic configuration of a distance image sensor 10 according to a preferred embodiment of the present invention.

First, a function and configuration of a distance image sensor 10 according to a preferred embodiment of the distance image measurement device of the present invention will be described with reference to FIG. 1. The distance image sensor 10 illustrated in FIG. 1 is a device that generates a distance image including distance information for each pixel using a time-of-flight method, and includes a light source 11, a computation circuit 12, and a plurality of pixel circuits (pixel circuit parts) 13. The light source 11 is a device that generates pulsed light $L_P$ with which a target S is irradiated, in order to perform distance measurement using a time-of-flight (TOF) scheme. The light source 11 includes, for example, a semiconductor light emitting element such as a light emitting diode or a laser diode, and a driving circuit that drives the semiconductor light emitting element. As the light source 11, an element that generates light in a wavelength region such as a near infrared region and a visible light region can be used. Further, the distance image sensor 10 includes a plurality of pixel circuits 13. The plurality of pixel circuits 13 are arranged in a two-dimensional array in directions in two dimensions (for example, a column direction and a row direction) to constitute an image sensor, and photoelectrically converts incident pulsed light $L_R$ generated due to reflection of the pulsed light $L_P$ at the target S to generate a detection signal. In addition, the distance image sensor 10 includes the computation circuit 12. The computation circuit 12 calculates distance information on the target S for each pixel using the detection signals generated by the plurality of pixel circuits 13, and generates and outputs a distance image including two-dimensional image information in which the distance information for each pixel is reflected. The computation circuit 12 may be configured of a dedicated integrated circuit such as a one-chip microcomputer including a CPU, a RAM, a ROM, an input/output device, and the like or may be configured of a general-purpose computer such as a personal computer.

Hereinafter, configurations of the pixel circuit 13 and the computation circuit 12 will be described in detail.

First, the configuration of the pixel circuit 13 will be described. The pixel circuit 13 includes a photoelectric conversion region 21 configured of semiconductor elements and having a function of converting the incident pulsed light $L_R$ to charge, first to fourth charge readout regions $22_1$ to $22_4$ and a charge discharge region 23 provided in proximity to the photoelectric conversion region 21 and apart from each other, first to fourth control electrodes $24_1$ to $24_4$ and a fifth control electrode 25 provided in correspondence to the first and fourth charge readout regions $22_1$ to $22_4$ and the charge discharge region 23, for applying a control pulse for charge transfer between the photoelectric conversion region 21 and the respective regions, and voltage detection means $26_1$ to $26_4$ for reading out detection signals from the first and fourth charge readout regions $22_1$ to $22_4$. The voltage detection means $26_1$ to $26_4$ are, for example, amplifiers including a source follower amplifier, and selectively detect and amplify voltages of the respective charge readout regions $22_1$ to $22_4$ based on reference potential under the control of the computation circuit 12, and output the amplified voltages to the computation circuit 12 as first to fourth detection signals.

The pixel circuit 13 is formed on, for example, a p-type semiconductor substrate such as a silicon substrate. That is, the photoelectric conversion region 21 is provided in a central portion of a pixel formation region including an active region forming layer formed of a p-type semiconductor, an n-type surface buried region, a p-type pinning layer, and an insulating film, which are formed in this order on the p-type semiconductor substrate. N-type charge readout regions $22_1$ to $22_4$ and the charge discharge region 23 having a higher impurity concentration than the n-type surface buried region are formed at positions spaced from each other to be close to the photoelectric conversion region 21, and control electrodes $24_1$ to $24_4$ and 25 are provided on respective charge transfer paths from the photoelectric conversion region 21 on the insulating film to the charge readout regions $22_1$ to $22_4$ and the charge discharge region 23. Here, the respective control electrodes $24_1$ to $24_4$ and 25 may be provided on the charge transfer path, or may be provided to be divided into a plurality of electrode portions to sandwich the charge transfer path from both sides.

In the pixel circuit 13 having the above configuration, control pulses having different phases are applied from the computation circuit 12 to be described below to the control electrodes $24_1$ to $24_4$ and 25. Thereby, depletion potentials of the surface buried region are sequentially changed, such that potential gradients allowing charge to be transferred to any of the charge transfer paths are sequentially formed, and majority carriers (charge) generated in the surface buried region of the photoelectric conversion region 21 are moved to any one of the charge readout regions $22_1$ to $22_4$ and the charge discharge region 23. This charge discharge region 23 is a region for discharging charge generated in the photoelectric conversion region 21.

Next, a configuration of the computation circuit 12 will be described. The computation circuit 12 includes, as functional components, a light source control means 31, a charge transfer control means 32, a distance data validity determination signal generation means 33, a distance data validity determination means 34, an invalid pixel identification value generation means 35, a distance calculation reference signal generation means 36, a distance calculation reference signal selection means 37, and a distance image generation means 38. The distance data validity determination signal generation means 33, the distance data validity determination means 34, the invalid pixel identification value generation means 35, the distance calculation reference signal generation means 36, the distance calculation reference signal selection means 37, and the distance image generation means 38 constitute a distance calculation means of the embodiment.

The light source control means 31 of the computation circuit 12 controls a light emission timing of the pulsed light $L_P$ in the light source 11, an intensity of the pulsed light $L_P$, and a pulse width of the pulsed light $L_P$. Specifically, the light source control means 31 performs control so that the pulsed light $L_P$ with the duration $T_0$ is repeatedly generated within four types of subframe periods within one frame period, which is a period $T_f$ (for example, 1/120 sec) having a preset length.

The charge transfer control means 32 of the computation circuit 12 has a function of applying first to fourth control pulses $G_1$ to $G_4$ and a fifth control pulse $G_D$ to the respective control electrodes $24_1$ to $24_4$ and 25. That is, the charge transfer control means 32 sequentially applies the first to fourth control pulses $G_1$ to $G_4$ to the control electrodes $24_1$ to $24_4$ only during a duration $T_1$ that is equal to or longer than the duration $T_0$ in correspondence to the respective generation timings of the pulsed light $L_P$ within a subframe period. In the embodiment, the duration $T_1$ is set to be equal to the duration $T_0$. Further, the charge transfer control means 32 applies, to the control electrode 25, the control pulse $G_D$ for discharging the charge accumulated in the photoelectric conversion region 21 to the charge discharge region 23 in a period other than application timings of the first to third control pulses $G_1$ to $G_3$ in the subframe period.

A resolution of 15 cm in a distance calculation using a time of flight of the pulsed light $L_P$ corresponds to a time of flight of 1 ns, and a control means having a time accuracy of the order of ps is required as a guide in order to improve this resolution. Therefore, since the charge transfer control means 32 and the light source control means 31 need to be designed in consideration of, for example, a wiring capacitance integrated with the pixel circuit 13, it is preferable for the charge transfer control means 32 and the light source control means 31 to be formed on a semiconductor integrated with the pixel circuit 13. "On a semiconductor integrated" also includes "on a different semiconductor layer" among a plurality of semiconductor layers stacked using a silicon on insulator (SOI) technology or a through silicon via (TSV) technology. Specifically, the charge transfer control means 32, a circuit between the charge transfer control means 32 and the control electrodes $24_1$ to $24_4$ and 25, and a part of a circuit between the charge transfer control means 32 and the light source control means 31 may be formed on the same semiconductor as the pixel circuit 13 or on a semiconductor layer stacked together with the pixel circuit 13.

Figure 2:
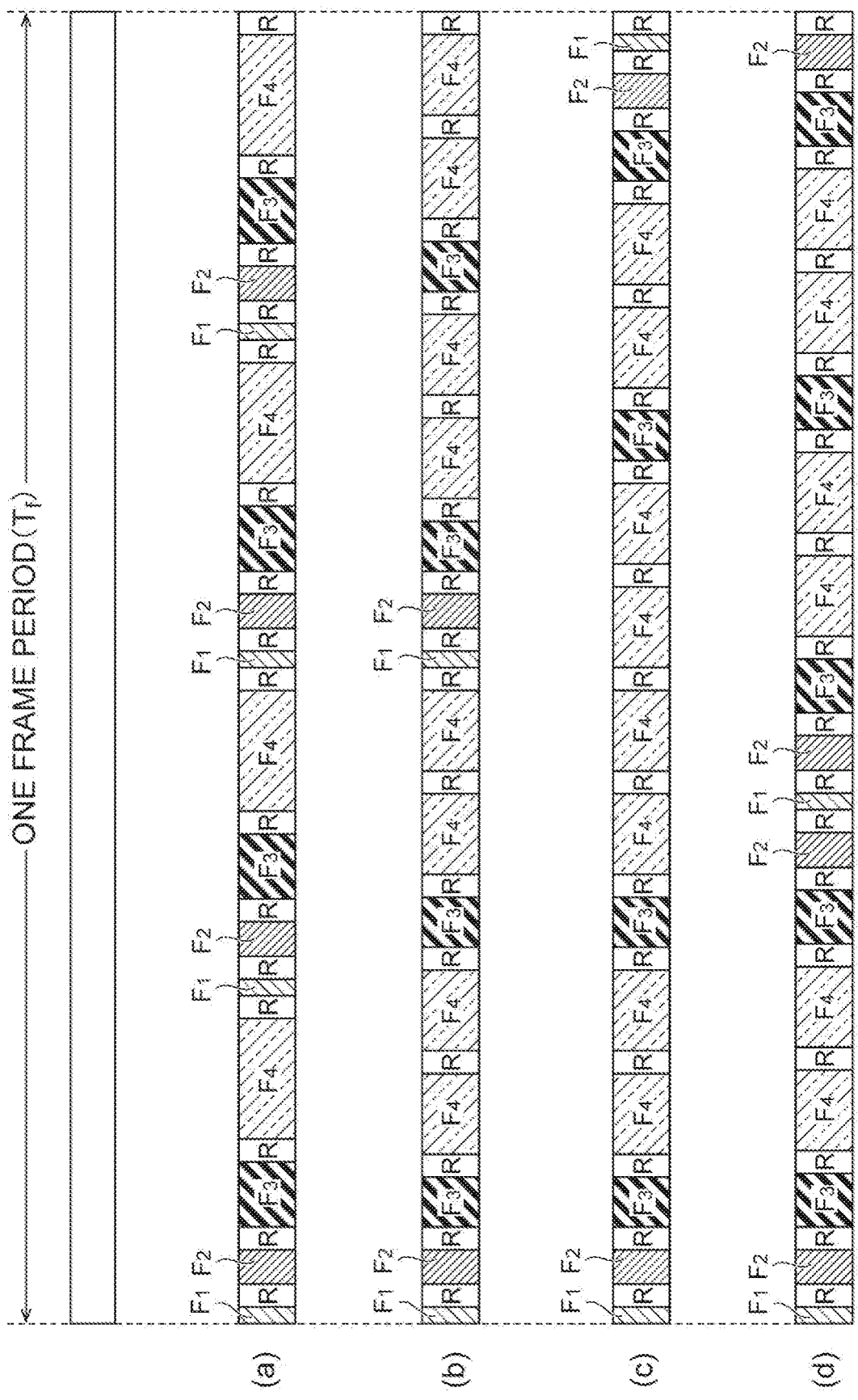
FIG. 2 is a diagram illustrating a configuration of one frame period, which is a repetition period of distance calculation in a computation circuit 12.

Here, one frame period ($T_F$), which is a repetition period of the distance calculation in the computation circuit 12 includes four types of subframe periods $F_1$ to $F_4$ in which the timings of the control pulses $G_1$ to $G_4$ and the $G_D$ with respect to the respective generation timings of the pulsed light $L_P$ are different, and a readout period R which is a period for reading out the first to fourth detection signals between these periods, as illustrated in FIG. 2. In one frame period ($T_F$), four types of subframe periods $F_1$ to $F_4$ having different lengths may be circulated and repeated as illustrated in part (a) of FIG. 2, and four types of subframe periods $F_1$ to $F_4$ having different periods may be repeated in any predetermined order as illustrated in each of parts (b), (c), and (d) of FIG. 2.

Figure 3:
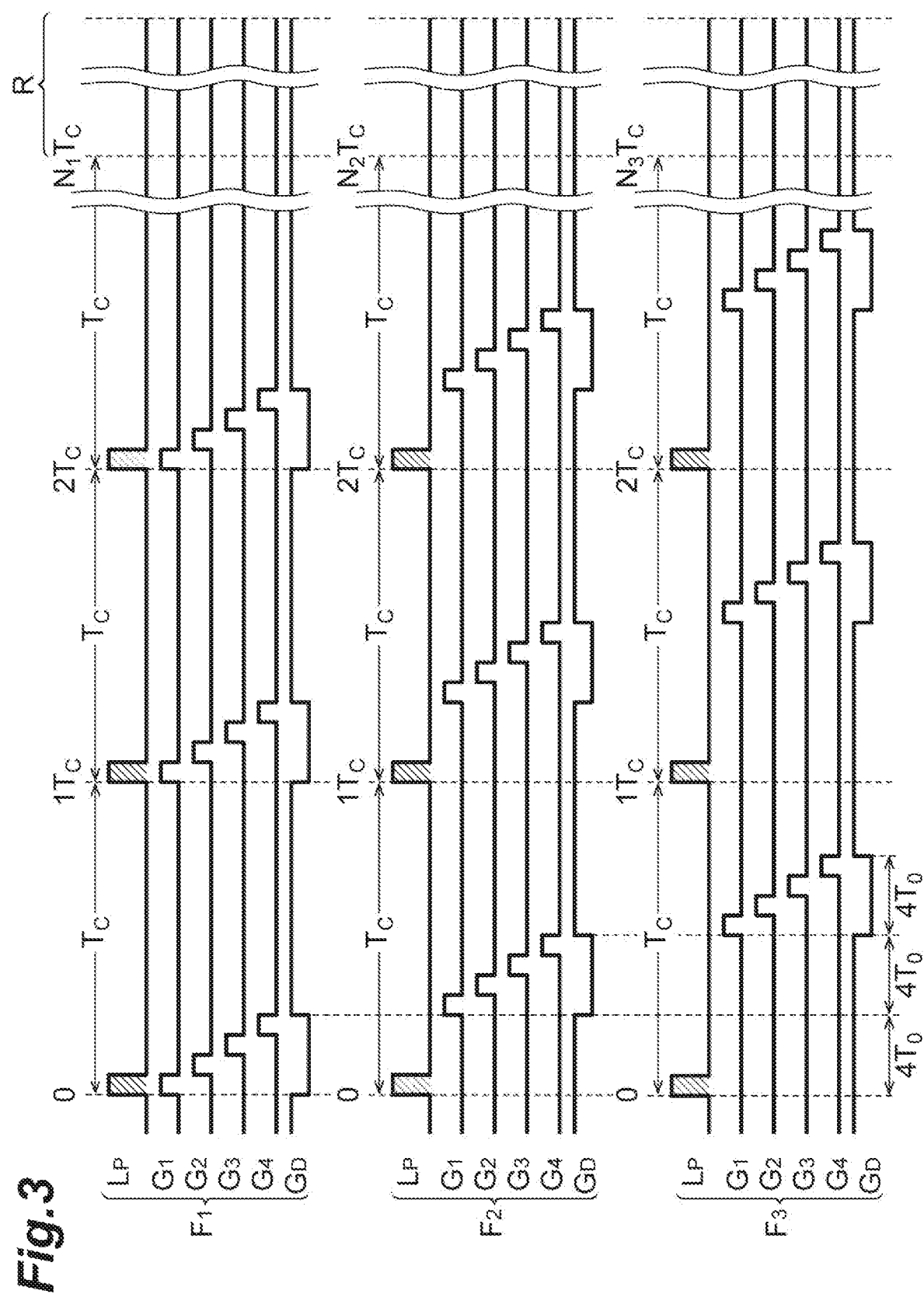
FIG. 3 is a timing chart illustrating timings of control pulses $G_1$ to $G_4$ in each of subframe periods $F_1$ to $F_3$ set by a charge transfer control means 32 of FIG. 1.

The charge transfer control means 32 of the computation circuit 12 sets the timing of the control pulses $G_1$ to $G_4$ so that the delay times of the control pulses $G_1$ to $G_4$ with respect to each generation timing of the pulsed light $L_P$ are shifted to a time differing between the four types of subframe periods $F_1$ to $F_4$. FIG. 3 is a timing chart illustrating an example of the timings of the control pulses $G_1$ to $G_4$ in each of the subframe periods $F_1$ to $F_3$ set by the charge transfer control means 32. Although FIG. 3 illustrates a timing chart regarding the subframe periods $F_1$ to $F_3$, the subframe period $F_4$ is also set to be further shifted from the delay time of the control pulses $G_1$ to $G_4$ in the subframe period $F_3$.

Specifically, in the subframe period $F_1$, the timing of the control pulse $G_1$ is set to match the generation timing of the pulsed light $L_P$ periodically repeated in a period $T_C$, the times of the control pulses $G_2$ to $G_4$ are sequentially set continuously so that the times do not overlap each other immediately thereafter, and the control pulse $G_D$ is set to be applied in a period other than the application period of the control pulses $G_1$ to $G_4$. The readout period R is set immediately after the subframe period $F_1$. On the other hand, in the subframe period $F_2$, the timings of the control pulses $G_1$ to $G_4$ are set so that the delay time of each of the control pulses $G_1$ to $G_4$ with respect to the generation timing of the pulsed light $L_P$ (hereinafter, this delay time is also referred to as a "range shift") is shifted by $+4T_0$, as compared to the subframe period $F_1$. This shift width is not limited to $+4T_0$ and may be another shift width such as $+3T_0$. Similarly, in the subframe period $F_3$, the timings of the control pulses $G_1$ to $G_4$ are set so that the delay time of each of the control pulses $G_1$ to $G_4$ with respect to the generation timing of the pulsed light $L_P$ is shifted by $+4T_0$, as compared to the subframe period $F_2$.

Figure 4:
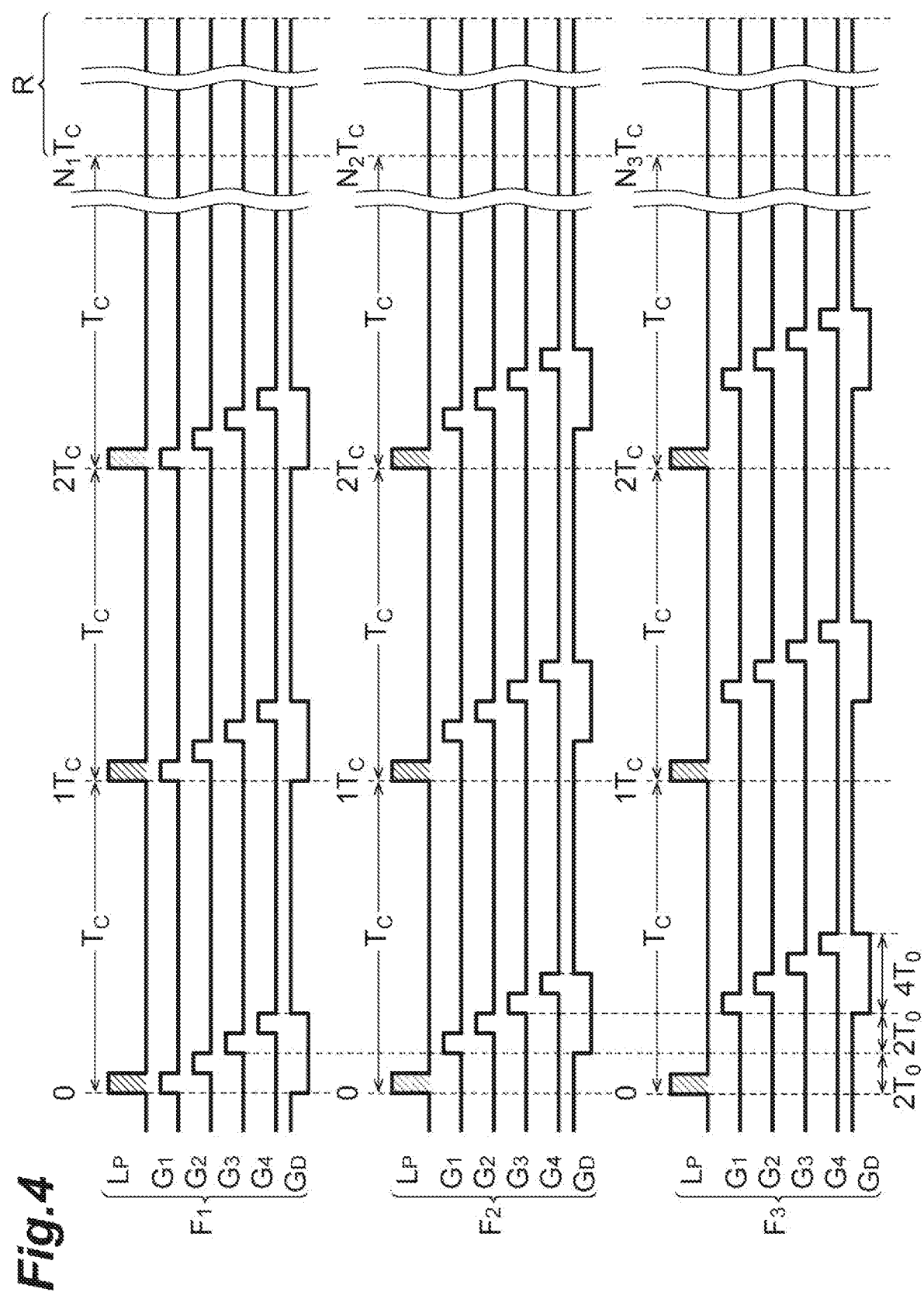
FIG. 4 is a timing chart illustrating timings of control pulses $G_1$ to $G_4$ in each of the subframe periods $F_1$ to $F_3$ set by the charge transfer control means 32 of FIG. 1.

FIG. 4 is a timing chart illustrating another example of the timings of the control pulses $G_1$ to $G_4$ in each of the subframe periods $F_1$ to $F_3$ set by the charge transfer control means 32. In this example, in the subframe period $F_2$, the timings of the control pulses $G_1$ to $G_4$ are set so that a delay time of each of the control pulses $G_1$ to $G_4$ with respect to the generation timing of the pulsed light $L_P$ is shifted by $+2T_0$, as compared to the subframe period $F_1$. Similarly, in the subframe period $F_3$, the timings of the control pulses $G_1$ to $G_4$ are set so that a delay time of each of the control pulses $G_1$ to $G_4$ with respect to the generation timing of the pulsed light $L_P$ is shifted by $+2T_0$, as compared to the subframe period $F_2$. A relationship between the subframe period $F_4$ and the subframe period $F_3$ is similarly set.

Further, lengths of the subframe periods $F_1$ to $F_4$ set by the computation circuit 12 become lengths $N_1 \cdot T_C$, $N_2 \cdot T_C$, $N_3 \cdot T_C$, and $N_4 \cdot T_C$ proportional to the number of repetitions $N_1$, $N_2$, $N_3$, and $N_4$ ($N_1$ to $N_4$ are integers) of the pulsed light $L_P$ in each of the subframe periods $F_1$ to $F_4$, and are set to increase as the delay time of each of the control pulses $G_1$ to $G_4$ with respect to the generation timing of the pulsed light $L_P$ becomes longer. In other words, the computation circuit 12 sets the number of repetitions $N_1$, $N_2$, $N_3$, and $N_4$ of the pulsed light $L_P$ in each of the subframe periods $F_1$ to $F_4$ to increase as the delay time of each of the control pulses $G_1$ to $G_4$ with respect to the generation timing of the pulsed light $L_P$ becomes longer. This means that the number of times the pulsed light $L_P$ is captured in the pixel circuit 13 is set to be dependent on a shift amount of the delay time since the intensity of the reflected light at the target is inversely proportional to a square of the distance to the target. That is, the length of each subframe period $F_K$ (K=1, 2, 3, and 4) is set so that the length is weighted by a weighting factor $W_K$ calculated using Equation (1) below.

[Math. 1]

$$W_K = \frac{K^{Nexp}}{\sum_{i=1}^{N} i^{Nexp}} \quad (1)$$

In the above Equation (1), Nexp is a predetermined constant. For example, when Nexp=2, the weighting factors of the number of times of capturing are $W_1=1/30$, $W_2=4/30$, $W_3=9/30$, and $W_4=16/30$. As a result, the number of times of capturing between the subframe periods $F_1$ to $F_4$ is weighted to increase as the range shift increases.

Referring back to FIG. 1, the distance calculation means of the computation circuit 12 repeatedly executes the calculation of the distance for each pixel circuit 13 in one frame period, and repeatedly generates a distance image including the resultant distance information. pecifically, the distance calculation means repeatedly performs the following distance calculation on the first to fourth detection signals $S_1$ to $S_4$ read out in the readout period R at each timing of the readout period R illustrated in part (a) of FIG. 2 (that is, according to an end timing of each of the subframe periods $F_1$ to $F_4$), and sets an average value of a resultant valid distance calculation result in one frame period, as the distance information. On the other hand, when a configuration of the subframe periods $F_1$ to $F_4$ illustrated in parts (a) to (d) of FIG. 2 is adopted, the distance calculation means may sum the values of the first to fourth detection signals $S_1$ to $S_4$ in each of four types of subframe periods $F_1$ to $F_4$ in one frame period, execute distance calculation for the summed first to fourth detection signals $S_1$ to $S_4$, collect (for example, average) results of the valid distance calculations among results thereof, and set a result of the collection as the distance information.

The distance data validity determination signal generation means 33 constituting the distance calculation means generates, as the distance data validity determination signal $S_A$, a sum value of the signal components of the charge generated from the incident pulsed light $L_R$ other than signal components of background light in the first to fourth detection signals $S_1$ to $S_4$ output from the pixel circuit 13 in correspondence to the light emission timing of the pulsed light $L_P$ on the basis of the first to fourth detection signals $S_1$ to $S_4$. The distance data validity determination signal $S_A$ is a signal indicating whether or not the first to fourth detection signals $S_1$ to $S_4$ strongly reflect the incident pulsed light $L_R$, and is a signal for determining whether or not the calculation of the distance based on the first to fourth detection signals $S_1$ to $S_4$ is valid. The distance data validity determination means 34 determines whether the calculation of the distance based on the first to fourth detection signals $S_1$ to $S_4$ is valid on the basis of the distance data validity determination signal $S_A$. Specifically, the distance data validity determination means 34 compares the distance data validity determination signal $S_A$ with a predetermined threshold value $Th_1$, determines that the distance calculation is valid when the distance data validity determination signal $S_A$ exceeds the threshold value $Th_1$, and determines that the distance calculation is invalid when the distance data validity determination signal $S_A$ is equal to or smaller than the threshold value $Th_1$. The invalid pixel identification value generation means 35 generates an identification value indicating whether or not the distance calculation is invalid for each pixel corresponding to the pixel circuit 13 on the basis of a determination result of the distance data validity determination means 34.

The distance calculation reference signal generation means 36 of the distance calculation means generates a distance calculation reference signal serving as a basis for calculation of the distance on the basis of the first to fourth detection signals $S_1$ to $S_4$ output from the pixel circuit 13 in correspondence to the light emission timing of the pulsed light $L_P$. Specifically, the distance calculation reference signal generation means 36 calculates a ratio between a difference value $S_{1-3}$ of one set $S_1$, $S_3$ of the detection signals among the first to fourth detection signals $S_1$ to $S_4$ and the distance data validity determination signal $S_A$ to generate a first distance calculation reference signal $X_R$. In addition, the distance calculation reference signal generation means 36 calculates a ratio between a difference value $S_{2-4}$ of the other set $S_2$, $S_4$ of the detection signals among the first to fourth detection signals $S_1$ to $S_4$ and the distance data validity determination signal $S_A$ to obtain a second distance calculation reference signal $Y_R$.

The distance calculation reference signal selection means 37 of the distance calculation means determines whether or not the position of the target S is within a measurement possibility range on the basis of the first and second distance calculation reference signals $X_R$ and $Y_R$, and outputs any one of the first and second distance calculation reference signals $X_R$ and $Y_R$ as a valid value to the distance image generation means 38 when the position of the target S is within the measurement possibility range. For example, the distance calculation reference signal selection means 37 determines whether the value of the distance calculation reference signal $X_R$ is equal to or greater than "0" and the value of the distance calculation reference signal $Y_R$ is equal to or smaller than $Th_3$, thereby determining whether the distance calculation reference signals $X_R$ and $Y_R$ are valid or invalid. Further, the distance calculation reference signal selection means 37 selects any one of the first and second distance calculation reference signals $X_R$ and $Y_R$ according to a result of a comparison between the first distance calculation reference signal $X_R$ and the threshold value $Th_2$, and outputs the selected first and second distance calculation reference signals $X_R$ and $Y_R$ to the distance image generation means 38 as valid values.

When it is determined that the distance calculation is valid, the distance image generation means 38 of the distance calculation means calculates the distance in each of the subframe periods $F_1$ to $F_4$ by referring to any one of the distance calculation reference signal $X_R$ and $Y_R$ selected by the distance calculation reference signal selection means 37 for each pixel circuit 13 and calculates the distance information from an average thereof. The distance image generation means 38 generates a distance image including the distance information corresponding to each pixel circuit 13 and outputs the generated distance image to an external device. Examples of the external device, which is an output destination, include output devices such as a display device and a communication interface device. In this case, the distance image generation means 38 can include an invalid value in the distance image for a pixel for which an identification value indicating that the distance calculation is invalid for all of the subframe periods $F_1$ to $F_4$ has been generated or a pixel for which the distance calculation reference signals $X_R$ and $Y_R$ have been determined to be outside the measurement possibility range for all of the subframe periods $F_1$ to $F_4$.

Figure 5:
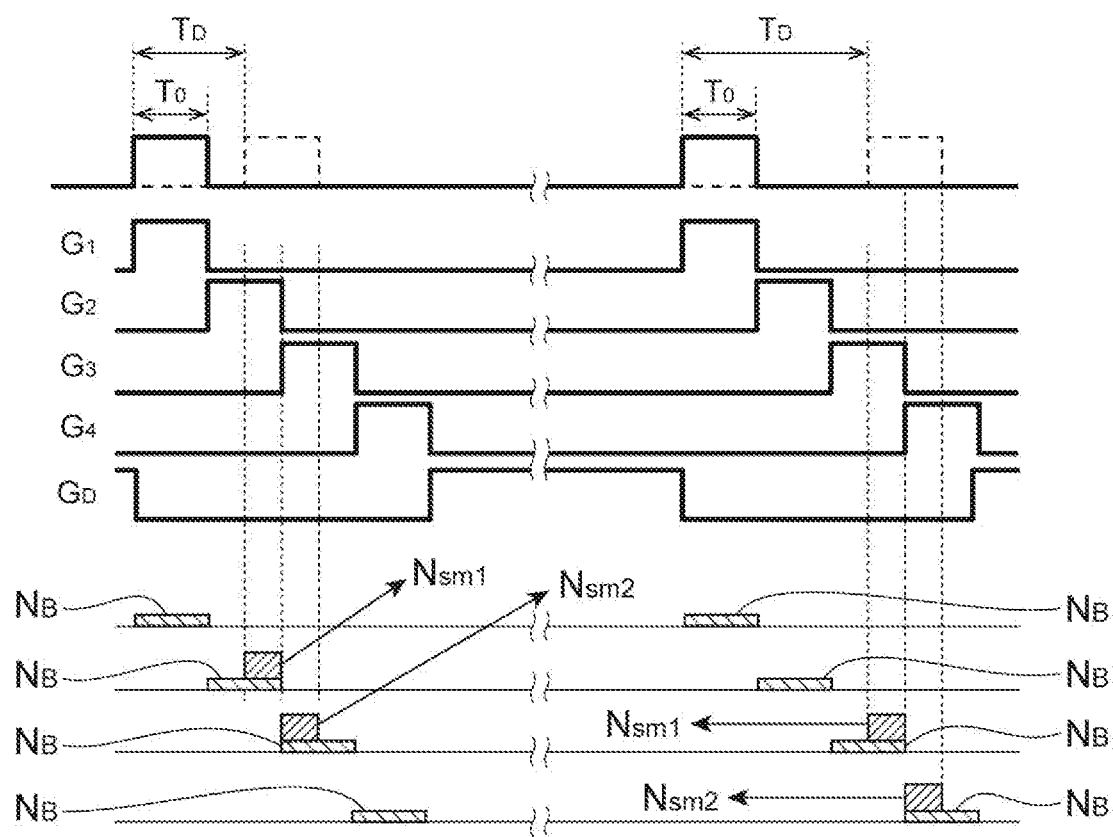
FIG. 5 is a timing chart illustrating a principle of distance calculation in the distance image sensor 10 of FIG. 1.

FIG. 5 is a timing chart illustrating a principle of distance calculation in the distance image sensor 10. In FIG. 5, timings of various signals that are controlled by the distance image sensor 10 and timings at which charge is accumulated in the respective regions of the pixel circuit 13 are illustrated, and the light emission timing of the pulsed light $L_P$, application timings of the first to fourth control pulses $G_1$ to $G_4$ and the control pulse $G_D$, and charge accumulation timings in the first to fourth the charge readout regions $22_1$ to $22_4$ are illustrated in this order from the top. Thus, the first to fourth control pulses $G_1$ to $G_4$ are continuously applied with the duration $T_0$ such that they do not overlap each other in correspondence to a light emission timing with the duration $T_0$ of the pulsed light $L_P$. Thus, the charge accumulated in the photoelectric conversion region 21 due to photoelectric conversion of the incident pulsed light $L_R$ is distributed to the two charge readout regions $22_2$ and $22_3$ or the two charge readout regions $22_3$ and $22_4$ at a ratio corresponding to the delay time $T_D$ of the incident pulsed light $L_R$ with respect to the pulsed light $L_P$.

Here, by setting a relationship between the light emission timing with the duration $T_0$ of the pulsed light $L_P$ and the application timing of the first control pulse $G_1$, only a charge amount $N_B$ of charge caused by noise such as background light and a dark current is transferred to the charge readout region $22_1$ in a time window defined by the control pulse $G_1$. On the other hand, charge obtained by adding a charge amount $N_{sm1}$ distributed in correspondence to the delay time $T_D$ to the charge amount $N_B$ is transferred to the charge readout region $22_2$, whereas charge obtained by adding a charge amount $N_{sm2}$ distributed in correspondence to the delay time $T_D$ to the charge amount $N_B$ is transferred to the charge readout region $22_3$ when an arrival timing of the incident pulsed light $L_R$ extends over two time windows defined by the control pulses $G_2$ and $G_3$.

On the other hand, when the arrival timing of the incident pulsed light $L_R$ extends over two time windows defined by the control pulses $G_3$ and $G_4$, charge obtained by adding a charge amount $N_{sm1}$ distributed in correspondence to the delay time $T_D$ to the charge amount $N_B$ is transferred to the charge readout region $22_3$, whereas charge obtained by adding a charge amount $N_{sm2}$ distributed in correspondence to the delay time $T_D$ to the charge amount $N_B$ is transferred to the charge readout region $22_4$. Using such a phenomenon, in the computation circuit 12 of the distance image sensor 10, it is possible to calculate the distance to the target S corresponding to the delay time $T_D$ by calculating a ratio between the charge amount $N_{sm1}$ excluding the charge amount $N_B$ and the charge amount $N_{sm2}$ excluding the charge amount $N_B$ according to the respective light emission timings of the pulsed light $L_P$.

Figure 6:
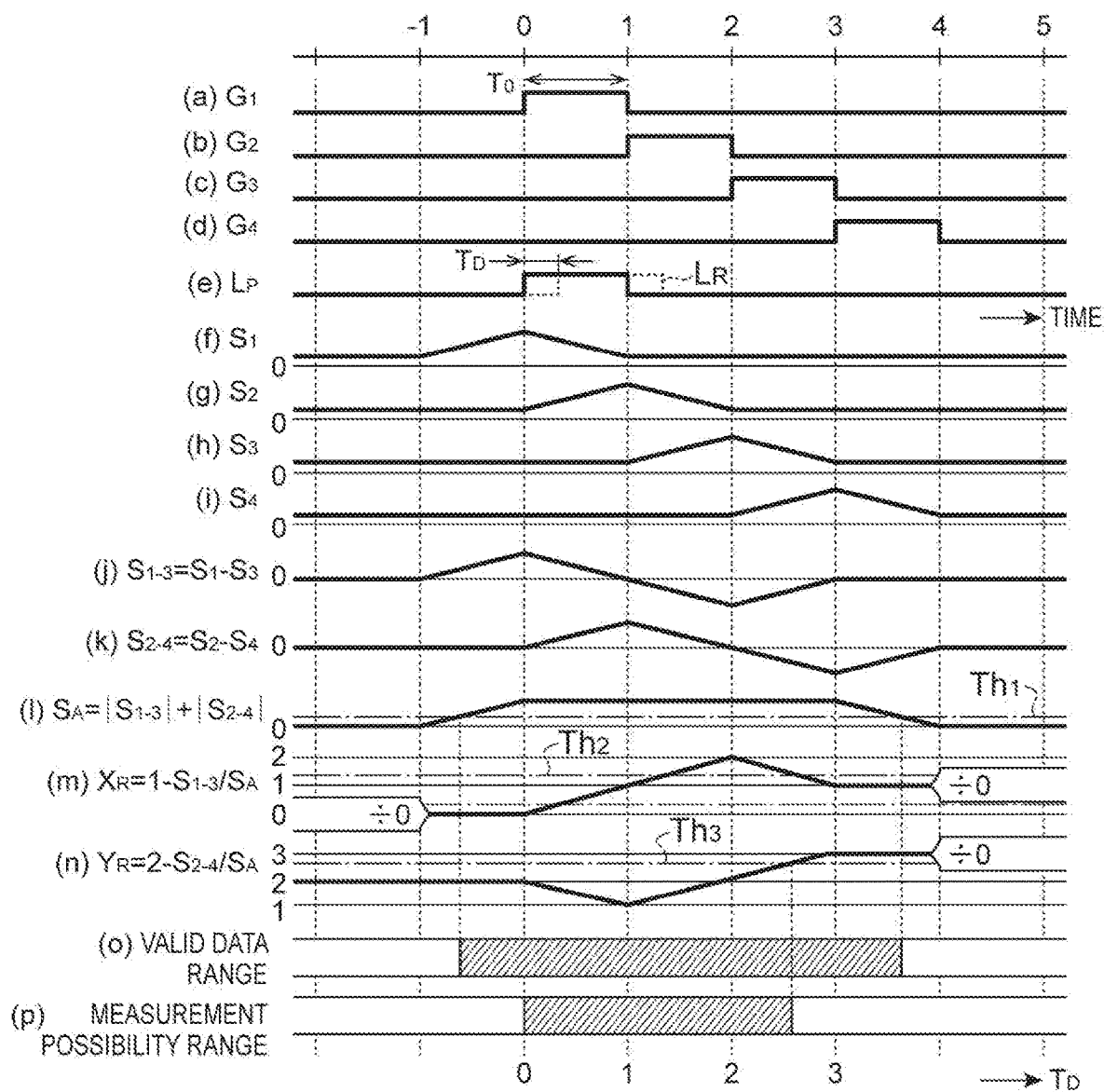
FIG. 6 is a graph showing a timing chart of various signals that are handled by the distance image sensor 10 in FIG. 1 and changes in various values calculated by the distance image sensor 10 with respect to a delay time $T_D$.

Next, details of a distance calculation procedure in the distance image sensor 10 will be described, and a distance image measurement method according to the embodiment (hereinafter also referred to as a "4-tap 3-zone 4-subframe scheme") will be described. This process is executed in units of the subframe periods $F_1$ to $F_4$. FIG. 6 is a graph showing a timing chart of various signals that are handled by the distance image sensor 10 and changes in various calculated values with respect to the delay time $T_D$. In FIG. 6, timings of the control pulses $G_1$ to $G_4$ and the pulsed light $L_P$ are illustrated in parts (a) to (e), respectively. Values of the first to fourth detection signal $S_1$ to $S_4$, values of the difference values $S_{1-3}$ and $S_{2-4}$, the value of the distance data validity determination signal $S_A$, and values of the distance calculation reference signals $X_R$ and $X_R$ are illustrated in correspondence to the delay time $T_D$ in parts (f) to (n), respectively. The valid data range in the delay time $T_D$ is illustrated in a part (o). The measurement possibility range in the delay time $T_D$ is illustrated in a part (p). Although FIG. 6 illustrates various signals and values handled in the distance calculation in the subframe period $F_1$, the same applies to the distance calculation in the subframe periods $F_2$ to $F_4$ except that the delay time $T_D$ is shifted.

First, when a distance image generation process is started by the distance image sensor 10, the light source control means 31 and the charge transfer control means 32 of the computation circuit 12 control timings of the control pulses $G_1$ to $G_4$ and the pulsed light $L_P$ within a period of one frame constituted by the subframe periods $F_1$ to $F_4$ (a light source control step and a charge transfer control step). Specifically, a timing of the pulsed light $L_P$ is set to a regular timing in each of the subframe periods $F_1$ to $F_4$, the control pulses $G_1$ to $G_4$ are set at continuous timings so that the control pulses $G_1$ to $G_4$ do not overlap each other in the duration $T_1=T_0$ on the basis of the timing of the pulsed light $L_P$, and the control pulse $G_D$ is set to be applied in a period other than the application period of the control pulses $G_1$ to $G_4$. Thereafter, in the readout period R, the first to fourth detection signals $S_1$ to $S_4$ are read out by the voltage detection means $26_1$ to $26_4$ of each pixel circuit 13 and the detection signals $S_1$ to $S_4$ are output to the computation circuit 12 (a voltage detection step).

Then, the computation circuit 12 calculates distance information for each pixel in units of subframe periods $F_1$ to $F_4$ on the basis of the detection signals $S_1$ to $S_4$ output from each pixel circuit 13 (a distance calculation step). That is, the distance data validity determination signal generation means 33 calculates the difference value $S_{1-3}$ of the detection signals $S_1$ and $S_3$ using Equation (2) below:

$$S_{1-3}=S_1-S_3 \quad (2)$$

on the basis of the detection signals $S_1$ and $S_3$, and then calculates the absolute value $|S_{1-3}|$ of the difference value. In addition, the distance data validity determination signal generation means 33 calculates the difference value $S_{2-4}$ of the detection signals $S_2$ and $S_4$ using Equation (3) below:

$$S_{2-4}=S_2-S_4 \quad (3)$$

on the basis of the detection signals $S_2$ and $S_4$, and then calculates the absolute value $|S_{2-4}|$ of the difference value. Further, the distance data validity determination signal generation means 33 calculates the value of the distance data validity determination signal $S_A$ using Equation (4) below:

$$S_A=|S_{1-3}|+|S_{2-4}| \quad (4)$$

by summing the absolute value $|S_{1-3}|$ of the difference value and the absolute value $|S_{2-4}|$ of the difference value. The distance data validity determination means 34 determines whether or not the calculation of the distance using the detection signals $S_1$ to $S_4$ is valid by comparing the value of the distance data validity determination signal $S_A$ with the threshold value $Th_1$. For example, by setting the threshold value $Th_1$ to about "0", it is determined that a range from a value between "−1" and "0" to a value between "3" and "4" of the delay time $T_D$ is a "valid data range" in which the calculation of the distance is valid, as illustrated in a part (o) of FIG. 6. Further, the distance calculation reference signal generation means 36 calculates a ratio of the difference value $S_{1-3}$ between the detection signals $S_1$ and $S_3$ to the value of the distance data validity determination signal $S_A$ to calculate a value of the first distance calculation reference signal $X_R$ using Equation (5) below:

$$X_R=1-S_{1-3}/S_A \quad (5),$$

and calculates a ratio of the difference value $S_{2-4}$ between the detection signals $S_2$ and $S_4$ to the value of the distance data validity determination signal $S_A$ to calculate a value of the second distance calculation reference signal $Y_R$ using Equation (6) below:

$$Y_R=2-S_{2-4}/S_A \quad (6).$$

Then, the distance calculation reference signal selection means 37 determines whether or not the value of the distance calculation reference signal $X_R$ is within a predetermined range, thereby selecting a value to be referred to for distance calculation from among the distance calculation reference signal $X_R$ and the distance calculation reference signal $Y_R$. For example, when the value of the distance calculation reference signal $X_R$ is equal to or greater than "0" and equal to or smaller than the threshold value $Th_2$, the distance calculation reference signal $X_R$ is selected, and when the value of the distance calculation reference signal $X_R$ exceeds the threshold value $Th_2$, the distance calculation reference signal $Y_R$ is selected. Using such a determination, it is possible to select a distance calculation reference signal reflecting a detection signal of a time window that an incidence timing of the incident pulsed light $L_R$ has overlapped according to the position of the target S. Further, the distance calculation reference signal selection means 37 determines whether or not values of the selected distance calculation reference signals $X_R$ and $Y_R$ are within a predetermined range, thereby determining whether the target S is within a measurement possibility range. For example, the distance calculation reference signal selection means 37 determines whether or not the value of the distance calculation reference signal $X_R$ is equal to or greater than "0", and determines whether or not the value of the distance calculation reference signal $Y_R$ is equal to or smaller than the threshold value $Th_3$. Using such a determination, a case in which the target S is too close, the incident pulsed light $L_R$ deviates from a time window of the detection signal $S_2$, and the distance is not reflected in the value of the distance calculation reference signal $X_R$ and a case in which the target S is too far, the incident pulsed light $L_R$ deviates from the time window of the detection signal $S_3$, and the distance is not reflected in the value of the distance calculation reference signal $Y_R$ can be excluded from the distance calculation. For example, a range from "0" to about "3" of the delay time $T_D$ is determined to be within the "measurement possibility range" as illustrated in a part (p) of FIG. 6 by setting the threshold value $Th_3$ to about "3".

Lastly, when the range is determined to be within the "valid data range" and the target S is determined to be within the "measurement possibility range", the distance image generation means 38 calculates the distance to the target S on the basis of the selected distance calculation reference signals $X_R$ and $Y_R$ regarding the pixel, averages calculation results of the respective subframe periods $F_1$ to $F_4$ to calculate distance information, and generates and outputs a distance image including calculated distance information of each pixel.

According to the procedure described above, since the amount of charge generated by the incident pulsed light $L_R$ can be distributed to 4×4=16 time windows corresponding to the detection signals $S_1$ to $S_4$ in the four types of subframe periods $F_1$ to $F_4$, it is possible to widen a range in which calculation corresponding to the delay time $T_D$ is possible and also to reduce a time width of the time window. Further, since a value changing linearly with respect to the delay time $T_D$ is selected from among the distance calculation reference signals $X_R$ and $Y_R$ and the calculation of the distance is performed, it is possible to calculate the distance by using a value of an appropriate distance data reference signal in correspondence to a range in which the target S is located, and to generate a highly accurate image signal regardless of the position of the target S.

Here, in the calculation procedure described above, the distance range in which the measurement can be performed in one subframe is a distance range corresponding to less than three time windows with respect to four time windows with a width of time $T_0$. Therefore, a distance range in which the distance measurement cannot be performed is likely to be generated at the timings of the control pulses $G_1$ to $G_4$ in each of the subframe periods $F_1$ to $F_3$ as illustrated in FIG. 3. In order to prevent such a situation, it is preferable for a scheme for setting the timings of the control pulses $G_1$ to $G_4$ in each of the subframe periods $F_1$ to $F_3$ as illustrated in FIG. 4 to be adopted. However, in this case, time windows corresponding to the distance range in which the distance measurement can be performed in the four subframes are 2×4=8 time windows.

Figure 7:
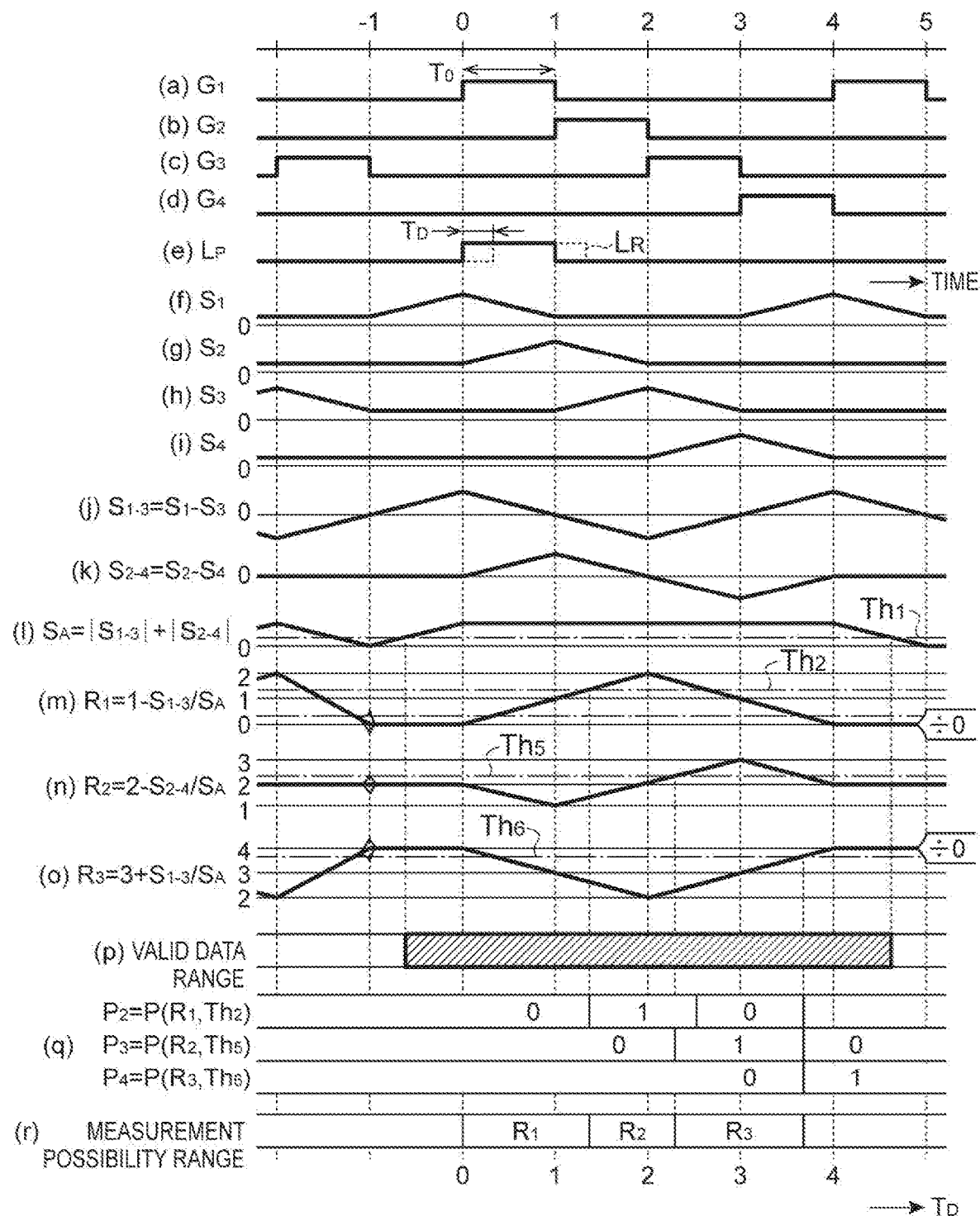
FIG. 7 is a graph showing a timing chart of various signals that are handled in another calculation procedure by the distance image sensor 10 in FIG. 1 and changes in various values calculated in another calculation procedure by the distance image sensor 10 with respect to the delay time $T_D$.

The distance calculation in the distance image sensor 10 described above may be performed in the following other procedure (hereinafter also referred to as a "4-tap 4-zone 4-subframe scheme"). According to this procedure, it is possible to widen the "valid data range" and the "measurement possibility range" in the delay time $T_D$. FIG. 7 is a graph showing a timing chart of various signals that are handled in another calculation procedure in the distance image sensor 10 and changes in various values calculated in another calculation procedure with respect to a delay time $T_D$. In FIG. 7, timings of the control pulses $G_1$ to $G_4$ and the pulsed light $L_P$ are illustrated in parts (a) to (e), respectively. Values of the first to fourth detection signals $S_1$ to $S_4$, values of the difference value $S_{1-3}$ and $S_{2-4}$, the value of the distance data validity determination signal $S_A$, and the values of the distance calculation reference signals $R_1$, $R_2$, and $R_3$ are illustrated in correspondence to the delay time $T_D$ in parts (f) to (o), respectively. The valid data range in the delay time $T_D$ is illustrated in a part (p). Values of comparison signals $P_2$ to $P_4$ calculated in correspondence to the delay time $T_D$ are illustrated in a part (q). The measurement possibility range in the delay time $T_D$ is illustrated in a part (r). Although FIG. 7 illustrates various signals and values handled in the distance calculation in the subframe period $F_1$, the same applies to the distance calculation in the subframe periods $F_2$ to $F_4$ except that the delay time $T_D$ is shifted.

First, when a distance image generation process is started by the distance image sensor 10, the light source control means 31 and the charge transfer control means 32 of the computation circuit 12 control timings of the control pulses $G_1$ to $G_4$ and the pulsed light $L_P$ within a period of one frame constituted by the subframe periods $F_1$ to $F_4$ (a light source control step and a charge transfer control step). Specifically, in the subframe periods $F_1$ to $F_4$, the timing of the pulsed light $L_P$ is set to a regular timing, the control pulses $G_1$ to $G_4$ are set at continuous timings so that the control pulses $G_1$ to $G_4$ do not overlap each other in the duration $T_1=T_0$ on the basis of such timing of the light, and the control pulse $G_D$ is set to be applied in a period other than the application periods of the control pulses $G_1$ to $G_4$. Here, after the control pulse $G_3$ is turned on immediately before a lighting timing of the pulsed light $L_P$, the control pulse $G_1$ is turned on again immediately after the four control pulses $G_1$ to $G_4$ are consecutively turned on. Thereafter, in the readout period R, the voltage detection means $26_1$ to $26_4$ of the respective pixel circuits 13 read out the first to fourth detection signals $S_1$ to $S_4$ and output the detection signals $S_1$ to $S_4$ to the computation circuit 12 (voltage detection step).

Then, the computation circuit 12 calculates distance information for each pixel in units of subframe periods $F_1$ to $F_4$ on the basis of the detection signals $S_1$ to $S_4$ output from each pixel circuit 13 (a distance calculation step). That is, the distance data validity determination signal generation means 33 calculates the difference value $S_{1-3}$ of the detection signals $S_1$ and $S_3$ and the difference value $S_{2-4}$ of the detection signals $S_2$ and $S_4$. In addition, the distance data validity determination signal generation means 33 calculates the value of the distance data validity determination signal $S_A$ on the basis of absolute values of the difference value $S_{1-3}$ and the difference value $S_{2-4}$. The distance data validity determination means 34 determines whether the calculation of the distance using the detection signals $S_1$ to $S_4$ is valid by comparing the value of the distance data validity determination signal $S_A$ with the threshold value $Th_1$. For example, by setting the threshold value $Th_1$ to about "0", it is determined that a range from a value between "−1" and "0" to a value between "4" and "5" of the delay time $T_D$ is a "valid data range" in which the calculation of the distance is valid, as illustrated in a part (p) of FIG. 7. Further, the distance calculation reference signal generation means 36 calculates a ratio between the difference value $S_{1-3}$ between the detection signals $S_1$ and $S_3$ and the value of the distance data validity determination signal $S_A$ to calculate a value of the distance calculation reference signal $R_1$ using Equation (7) below:

$$R_1 = 1 - S_{1-3}/S_A \tag{7}$$

calculates a ratio between the difference value $S_{2-4}$ between the detection signals $S_2$ and $S_4$ and the value of the distance data validity determination signal $S_A$ to calculate a value of the distance calculation reference signal $R_2$ using Equation (8) below:

$$R_2 = 2 - S_{2-4}/S_A \tag{8}$$

and calculates a ratio between the difference value $S_{1-3}$ between the detection signals $S_1$ and $S_3$ and the value of the distance data validity determination signal $S_A$ to calculate a value of the distance calculation reference signal $R_3$ using Equation (9) below:

$$R_3 = 3 + S_{1-3}/S_A \tag{9}$$

The distance calculation reference signal selection means 37 compares the values of distance calculation reference signals $R_1$ to $R_3$ with a threshold value, such that a value to be referred to for distance calculation is selected from the distance calculation reference signals $R_1$ to $R_3$. For example, when the distance calculation reference signal $R_1$ is equal to or smaller than the threshold value $Th_2$ and the distance calculation reference signal $R_2$ is equal to or smaller than a threshold value $Th_5$, the distance calculation reference signal $R_1$ is selected. On the other hand, when the distance calculation reference signal $R_1$ exceeds the threshold value $Th_2$ and the distance calculation reference signal $R_2$ is equal to or smaller than the threshold value $Th_5$, the distance calculation reference signal $R_2$ is selected. Further, when the distance calculation reference signal $R_2$ exceeds the threshold value $Th_5$, the distance calculation reference signal $R_3$ is selected. Using such a determination, it is possible to select a distance calculation reference signal reflecting a detection signal of a time window that an incidence timing of the incident pulsed light $L_R$ has overlapped according to the position of the target S.

Further, the distance calculation reference signal selection means 37 determines whether or not values of the selected distance calculation reference signals $R_1$ and $R_3$ are within a predetermined range, thereby determining whether the target S is within a measurement possibility range. For example, the distance calculation reference signal selection means 37 determines whether or not the value of the distance calculation reference signal $R_1$ is equal to or greater than "0", and determines whether or not the value of the distance calculation reference signal $R_3$ is equal to or smaller than the threshold value $Th_6$. Using such a determination, a case in which the target S is too close, the incident pulsed light $L_R$ deviates from a time window of the detection signal $S_2$, and distance is not reflected in the value of the distance calculation reference signal $R_1$, and a case in which the target S is too far, the incident pulsed light $L_R$ deviates from the time window of the detection signal $S_4$, and the distance is not reflected in the value of the distance calculation reference signal $R_3$ can be excluded from the distance calculation. For example, a range from "0" to about "4" of the delay time $T_D$ is determined to be within the "measurement possibility range" as illustrated in a part (r) of FIG. 7 by setting the threshold value $Th_6$ to about "4". Further, the comparison signal $P_2$ obtained as a result of comparing the distance calculation reference signal $R_1$ with the threshold value $Th_2$, the comparison signal $P_3$ obtained as a result of comparing the distance calculation reference signal $R_2$ with the threshold value $Th_5$, and the comparison signal $P_4$ obtained as a result of comparing the distance calculation reference signal $R_3$ with the threshold value $Th_6$ are illustrated in a part (q) of FIG. 7.

Lastly, when the range is determined to be within the "valid data range" and the target S is determined to be within the "measurement possibility range", the distance image generation means 38 calculates the distance to the target S on the basis of the distance calculation reference signals $R_1$ to $R_3$ selected regarding the pixel, averages calculation results of the respective subframe periods $F_1$ to $F_4$ to calculate distance information, and generates and outputs a distance image including the calculated distance information of each pixel.

According to the procedure described above, since the amount of charge generated by the incident pulsed light $L_R$ can be distributed to the 4×4=16 time windows corresponding to four continuous control pulses $G_1$ to $G_4$ in the four types of subframe periods $F_1$ to $F_4$, it is possible to widen a range in which the delay time $T_D$ can be calculated and to also reduce the time width of the time window. Further, since a value changing linearly with respect to the delay time $T_D$ is selected from the distance calculation reference signals $R_1$, $R_2$, and $R_3$ and the calculation of the distance is performed, it is possible to calculate the distance by using a value of an appropriate distance data reference signal in correspondence to a range in which the target S is located, and to generate a highly accurate image signal regardless of the position of the target S.

Here, in the calculation procedure described above, the distance range in which the measurement can be performed in one subframe is a distance range corresponding to less than four time windows with respect to five time windows with a width of time $T_0$. Therefore, a distance range in which the distance measurement cannot be performed is likely to be generated at the timings of the control pulses $G_1$ to $G_4$ in each of the subframe periods $F_1$ to $F_3$ as illustrated in FIG. 3. In order to prevent such a situation, it is preferable for a scheme for shifting the timings of the control pulses $G_1$ to $G_4$ in each of the subframe periods $F_1$ to $F_3$ by +3$T_0$ to be adopted. However, in this case, time windows corresponding to the distance range in which the distance measurement can be performed in the four subframes are 3×4=12 time windows.

Operations and effects of the above-described embodiment will be described.

According to the distance image sensor 10 of the embodiment, the pulsed light $L_P$ is regularly and repeatedly generated from the light source 11 within the four subframe periods $F_1$ to $F_4$ included in one frame period, the time window with the duration $T_1$ equal to or longer than the duration $T_0$ of the pulsed light $L_P$ is sequentially set in correspondence to the generation of the pulsed light $L_P$, the charge is sequentially transferred from the photoelectric conversion region 21 of the pixel circuit 13 to the first to fourth charge readout regions $22_1$ to $22_4$ in the time window, and the charge is discharged from the photoelectric conversion region 21 to the charge discharge region 23 in a period other than the time window. Further, the first to fourth detection signals $S_1$ to $S_4$ are read out from the first to fourth the charge readout regions $22_1$ to $22_4$ of the pixel circuit 13 for each of the subframe periods $F_1$ to $F_4$, and the distance is calculated repeatedly on the basis of these. In this case, the delay times (range shifts) of the time window with respect to the generation timing of the pulsed light $L_P$ are set to be shifted to a time differing between the four types of subframe periods $F_1$ to $F_4$.

Thus, it is possible to detect charge using a large number of time windows having a small duty ratio by combining a range shift of the time window in units of the pixel circuits 13 with a range shift of the time window between the subframe periods $F_1$ to $F_4$. For example, according to the example of FIG. 3, 4×3=12 types of time windows of range shift are set. According to the example of FIG. 4, eight types of time windows of range shift are set. As a result, even when the target S in various distance measurement ranges is targeted, an influence of background light noise on the detection signal can be reduced, distance calculation with high distance resolution can be realized, and an error in the distance calculation due to saturation of the detection signal caused by strong background light can also be prevented.

Further, in the distance image sensor 10, the distance calculating means of the computation circuit 12 calculates the distance in each of the subframe periods $F_1$ to $F_4$. In this case, it is possible to calculate a distance having a high distance resolution according to the distance measurement range of the target S.

Further, in the distance image sensor 10, the number of repetitions of the pulsed light $L_P$ in each of the subframe periods $F_1$ to $F_4$ in one frame period is weighted to increase as a shift time of the range shift increases. Thereby, it is possible to increase the number of projections of the light pulse (the number of charge accumulations within the pixel)

for a frame in a far distance measurement range according to the distance measurement range in each of the subframe periods $F_1$ to $F_4$, and decrease the number of projections of the light pulse (the number of charge accumulations within the pixel) for a frame in a near distance measurement range, and to improve the distance resolution. In particular, since the intensity of the incident pulsed light $L_R$ decreases in inverse proportion to the square of the distance, the subframe periods $F_1$ to $F_4$ are weighted by a square of a measured distance. Thereby, it is possible to allocate a larger number of light projections to the subframe period of the longest measured distance at which the distance resolution is the lowest, and to improve a minimum value of the distance resolution (which can be caused in the subframe period with the longest measurement distance). For example, the minimum value of the distance resolution is improved by $2^{1/2}$ times as compared to a case in which the number of light projections is evenly allocated in the subframe period. As a result, it is possible to prevent a decrease in the distance resolution in a far distance measurement range and to efficiently maintain the distance resolution as a whole.

Further, in the distance image sensor 10, voltages of the respective first to fourth charge readout regions $22_1$ to $22_4$ generated according to the application of the first to fourth control pulses $G_1$ to $G_4$ are read out as the first to fourth detection signals $S_1$ to $S_4$ and the distance calculation is executed using these in each of the subframe periods $F_1$ to $F_4$ of the period set with a weight. In this case, it is possible to prevent the saturation of the detection signals $S_1$ to $S_4$ caused by strong background light, and as a result, to improve a dynamic range of the distance measurement.

Next, effects of the improvement of the distance resolution in the embodiment will be described through comparison with a comparative example.

Preconditions for the following simulation are shown in the following table.

TABLE 1

| Items | Calculation conditions |
|---|---|
| Average light power of pulsed light | 0.6 W |
| Wavelength of pulsed light | 870 nm |
| Quantum efficiency of photoelectric conversion | 30% @ 870 nm |
| Degree of modulation | 80% @ 2.5 ns |
| Pixel size | 16.8 μm × 16.8 μm |
| Number of range shift types in subframe (including delay time of 0) | 1, 2, 3, 4 |
| Number N of subframes with different range shift types | 1, 2, 3, 4 |
| Number of subframes with the same range shift type | 1 |
| Pulse width of pulsed light (first duration) | 2.67 ns |
| Pulse width of control pulse (second duration) | 2.67 ns |
| Repetition period of pulsed light | 106.7 ns |
| Duty of pulsed light | 1/40 |
| Background light illuminance | 100 klux, 0 lux |
| Subject reflectance | 15% (resolution) 95% (number of generated electrons) |
| Subframe rate ($F_x$ + R) (* Except for FIG. 10) | N = 2 60 fps N = 3 90 fps N = 4 120 fps |
| Frame rate | 30 fps |

Figure 8:
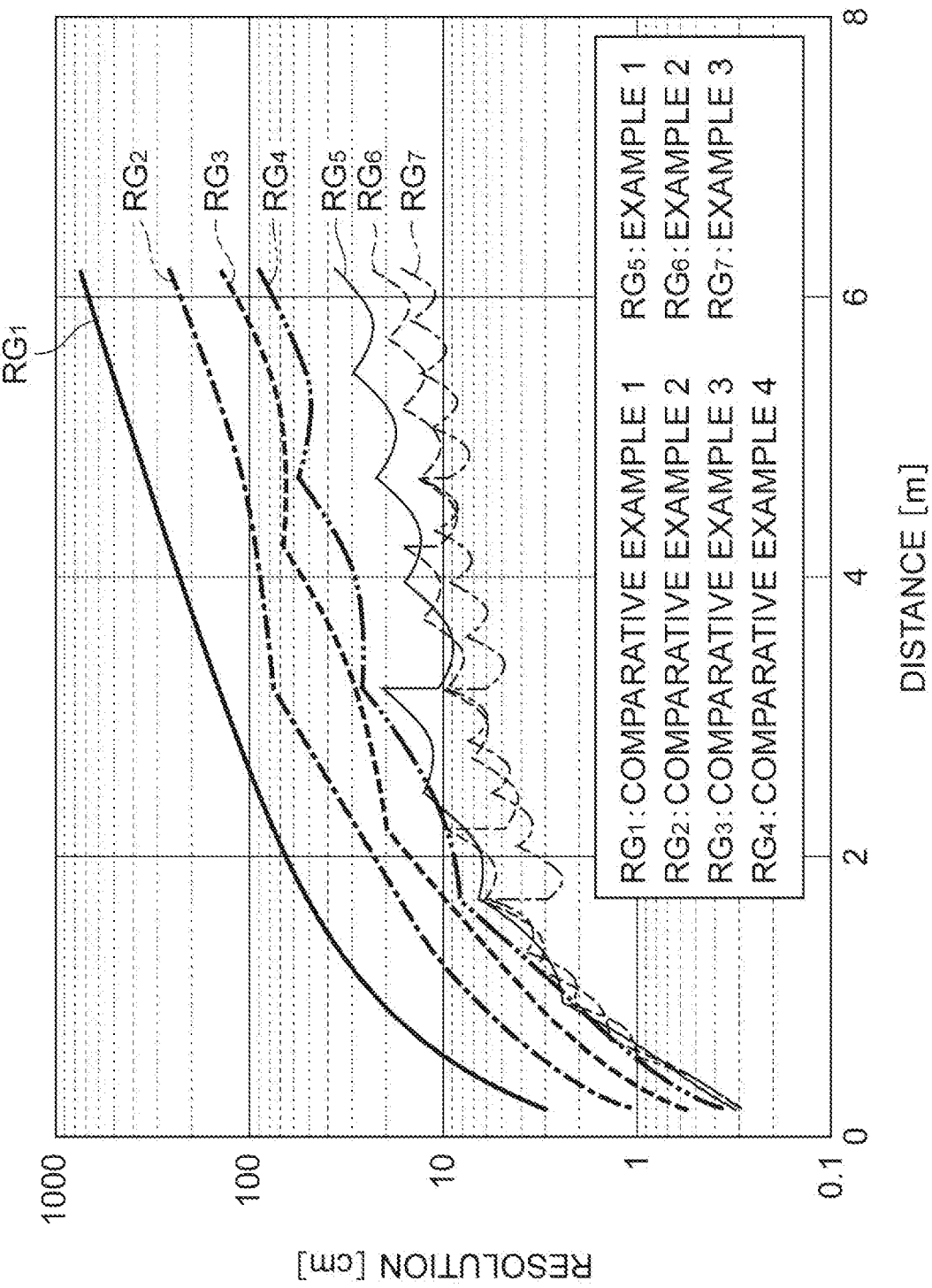
FIG. 8 is a graph illustrating simulation results of a distance resolution of the embodiment when distance measurement is performed in a distance range from 0.2 to 6 m.
Figure 9:
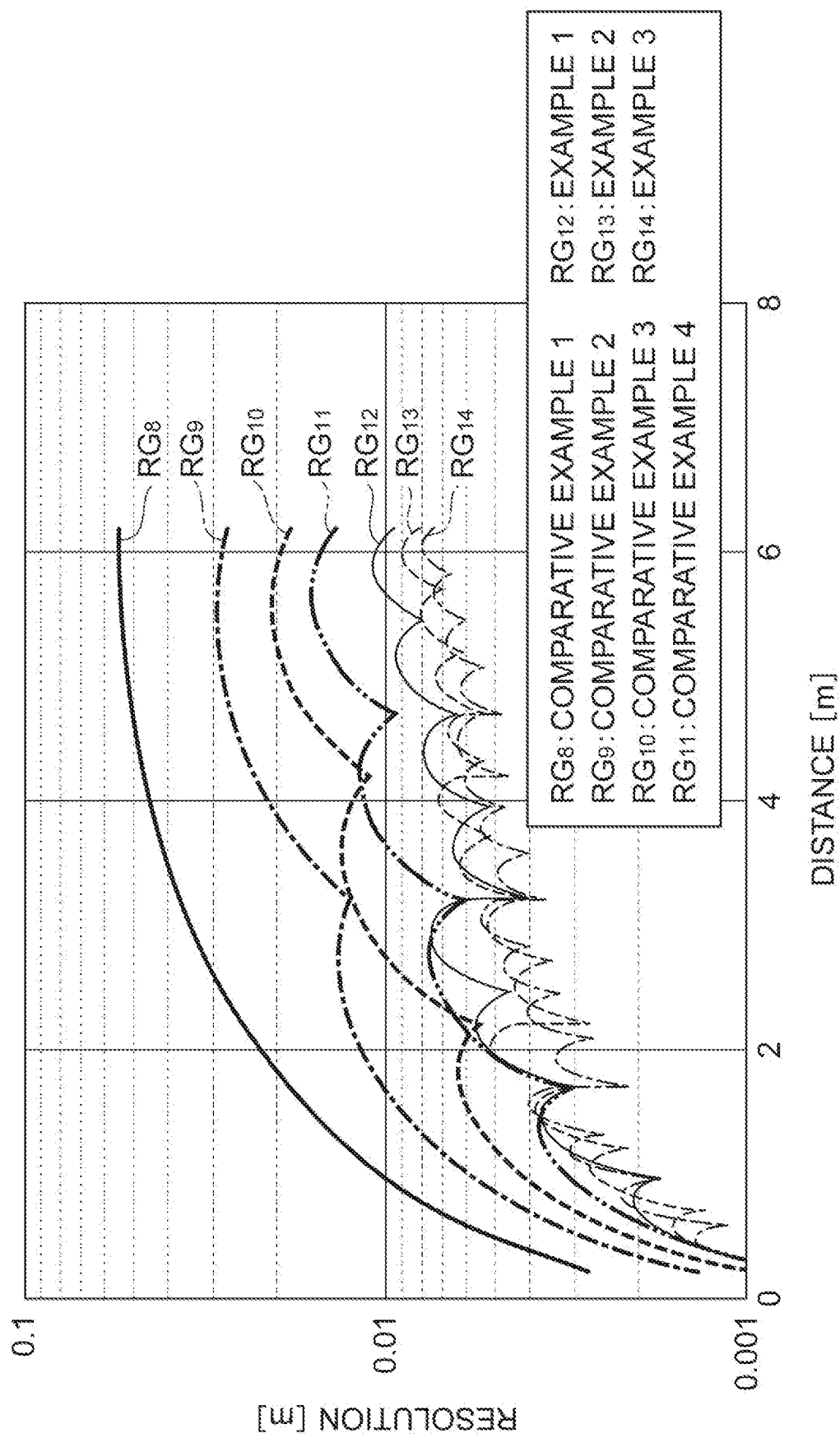
FIG. 9 is a graph illustrating simulation results of a distance resolution of the embodiment when distance measurement is performed in a distance range from 0.2 to 6 m.

FIGS. 8 and 9 show simulation results of the distance resolution of the embodiment when distance measurement has been performed in a measurement range from 0.2 to 6 m in comparison with the comparative example. A resolution in measurement under background light of 100 klux is illustrated in FIG. 8, and a resolution in measurement under background light of 0 lux is illustrated in FIG. 9. Comparative Example 1 shows a case in which one type of range shift is set for each subframe and one type of subframe is included within one frame period. Comparative Example 2 shows a case in which two types of range shifts are set for each subframe and one type of subframe is included within one frame period. Comparative Example 3 shows a case in which three types of range shifts are set for each subframe and one type of subframe is included within one frame period. Comparative Example 4 shows a case in which four types of range shifts are set for each subframe and one type of subframe is included within one frame period. Example 1 shows a case in which four types of range shifts are set for each subframe, and two types of range shifts of the subframe are shifted in two types of subframe periods within one frame period, Example 2 shows a case in which four types of range shifts are set for each subframe, and three types of range shifts of the subframe are shifted in three types of subframe periods within one frame period, and Embodiment 3 shows a case in which four types of range shifts are shifted are set for each subframe, and fourth types of range shifts of the subframe are shifted in fourth types of subframe periods within one frame period. However, in Embodiments 1 to 3, it is assumed that lengths of a plurality of subframe periods are not weighted, and the lengths of the plurality of subframe periods are set to be equal within one frame period.

It was found that, in Comparative Example 1, a resolution of about 7 m was estimated in a distance measurement of 6 m, whereas in Examples 1 to 3, the resolution was improved as the number of subframe periods was increased, and in Example 3, the resolution was improved to 20 cm in the distance measurement of 6 m, as illustrated in FIG. 8. It was also found that, in Comparative Example 1, a resolution of about 5.5 cm was estimated in the distance measurement of 6 in, whereas in Examples 1 to 3, the resolution was improved as the number of subframe periods was increased, and in Example 3, the resolution was improved to 8 mm in the distance measurement of 6 m, as illustrated in FIG. 9.

Figure 10:
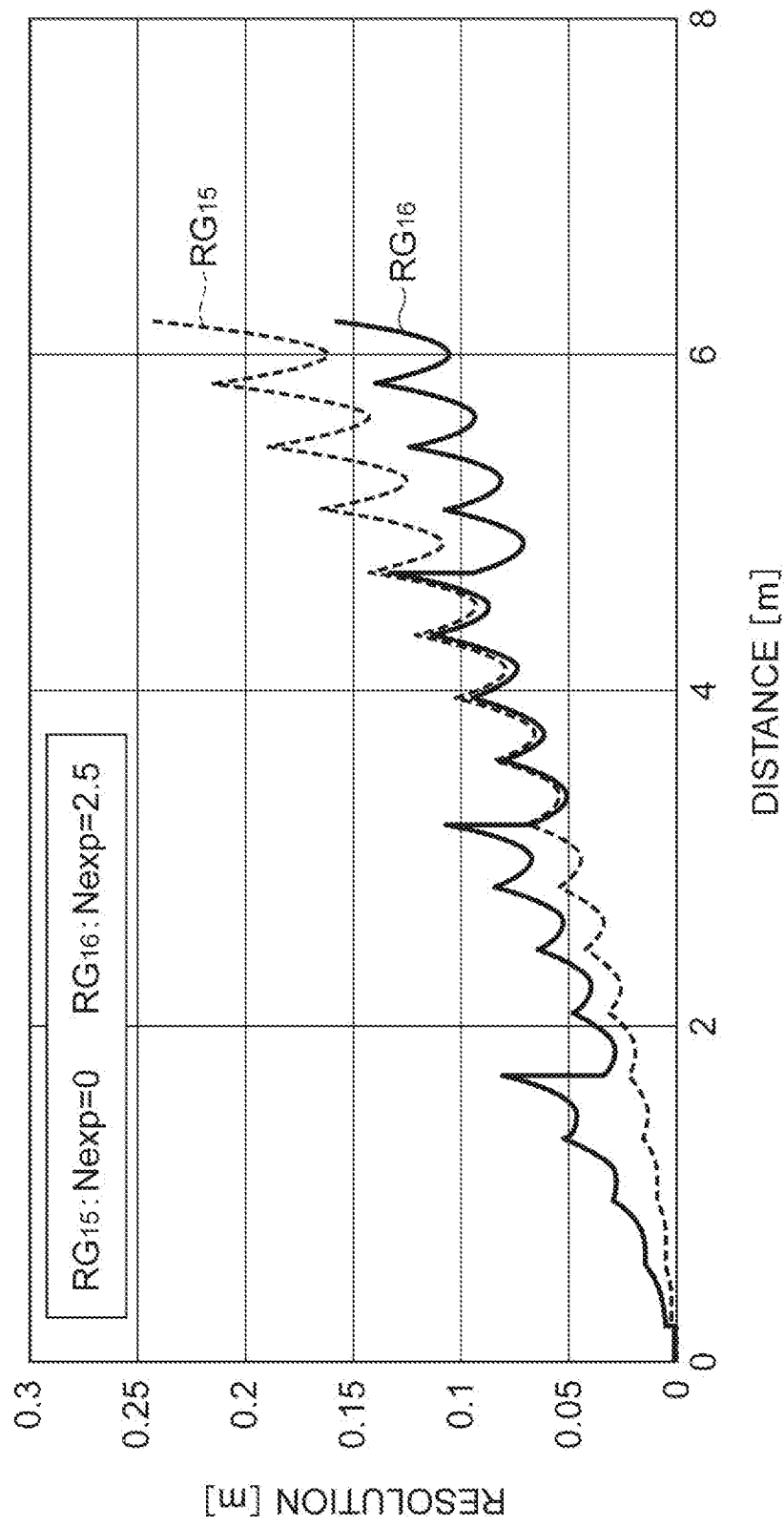
FIG. 10 is a graph illustrating simulation results of a distance resolution of the embodiment when distance measurement is performed in a distance range from 0.2 to 6 m.

Further, FIG. 10 illustrates a comparison between simulation results of the distance resolution of the embodiment when the distance measurement is performed in a measurement range from 0.2 to 6 m under background light of 100 klux between a case in which a length of a subframe period is weighted and a case in which the length of a subframe period is not weighted. A graph $RG_{15}$ shows a case in which the length of the subframe period is not weighted with a constant Nexp=0 in Embodiment 3, and a graph $RG_{16}$ shows a case in which the length of the subframe period is weighted with a constant Nexp=2.5 in Embodiment 3. It can be seen from this result that the worst value of the distance resolution is 21.5 cm in distance measurement up to 6 m when the length of the subframe period is not weighted, whereas the worst value of the distance resolution is improved to 14 cm when the length of the subframe period is weighted.

Figure 11:
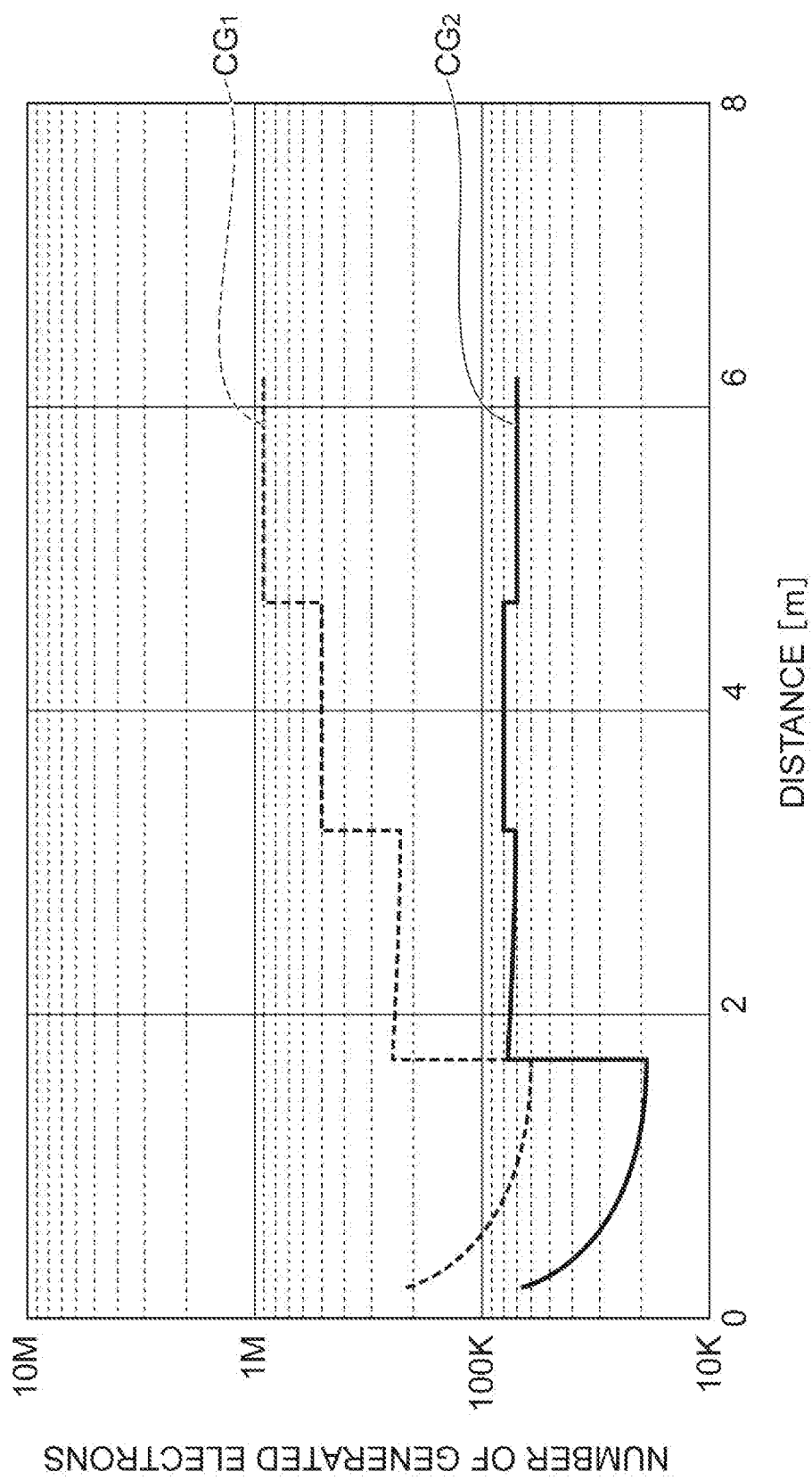
FIG. 11 is a graph illustrating simulation results of the number of generated electrons at the time of signal readout in the embodiment when distance measurement is performed in a distance range from 0.2 to 6 m.

Further, FIG. 11 illustrates a comparison between simulation results of the number of generated electrons in each signal readout of the embodiment when the distance measurement is performed in a measurement range from 0.2 to 6 m under background light of 100 klux between the embodiment and a comparative example. A graph $CG_1$ shows the number of generated electrons when signal readout is performed in units of one frame period in Comparative Example 4, and a graph $CG_2$ shows the number of generated electrons when signal readout is performed in units of the subframe periods $F_1$ to $F_4$ set as illustrated in part (d) of FIG. 2 in Example 3. As shown in these results, in the embodiment, the number of generated electrons in the signal readout is curbed in a wide measurement range.

Thus, in the embodiment, saturation due to a large amount of charge caused by strong background light such as sunlight can be prevented by performing signal readout for each subframe. Further, since the number of saturated electrons in the charge detection unit of the pixel can be set relatively low, a size of a capacitor for detection of charge built into the pixel can be reduced. For example, when the number of electrons can be reduced to 100,000 or less, background light of 100 klux can be handled with a capacitor of 10 fF. It is possible to increase a conversion gain since the size of the capacitor can be reduced, which is advantageous for noise.

On the other hand, readout noise is likely to be added and the resolution of the distance calculation is likely to be decreased by performing signal readout for each subframe. However, it is possible to reduce an influence of noise by sufficiently reducing the noise per readout in a situation in which shot noise caused by strong background light is dominant.

The present invention is not limited to the aspect of the embodiment described above.

Although four the charge readout regions $22_1$ to $22_4$ are provided in the pixel circuit 13 in the above-described embodiment, any number of charge readout regions may be provided as long as the number of charge readout regions is three or more. In this case, the control electrodes and the voltage detection means are provided in correspondence to the number of charge readout regions, and the computation circuit 12 calculates distance information on the basis of the detection signals read from the respective charge readout regions.

Further, although one frame period includes four types of subframe periods $F_1$ to $F_4$ in the above-described embodiment, any type of subframe periods may be included as long as the number of subframe periods are two or more. In this case, the charge transfer control means 32 of the computation circuit 12 sets a timing of the control pulse so that the delay times of the control pulses are shifted to a different time with respect to the generation timing of the pulsed light $L_P$ according to the number of types of subframe periods.

In the above embodiment, the distance calculation means of the computation circuit 12 has executed the distance calculation for the first to fourth detection signals $S_1$ to $S_4$ in each of four types of subframe periods $F_1$ to $F_4$ within one frame period. However, the present invention is not limited to such an aspect.

For example, the distance calculation means may execute the distance calculation for a detection signal detected over two subframe periods $F_1$ and $F_2$. Details of a procedure of the distance calculation in the distance calculation means of the computation circuit 12 in a modification example of such an aspect will be described with reference to FIG. 12. Although the calculation of the distance is executed on the basis of the detection signal detected over the two subframe periods $F_1$ and $F_2$ in the modification example, the calculation of the distance may be executed on the basis of a detection signal detected over two subframe periods $F_2$ and $F_3$ or the two subframe periods $F_3$ and $F_4$.

Figure 12:
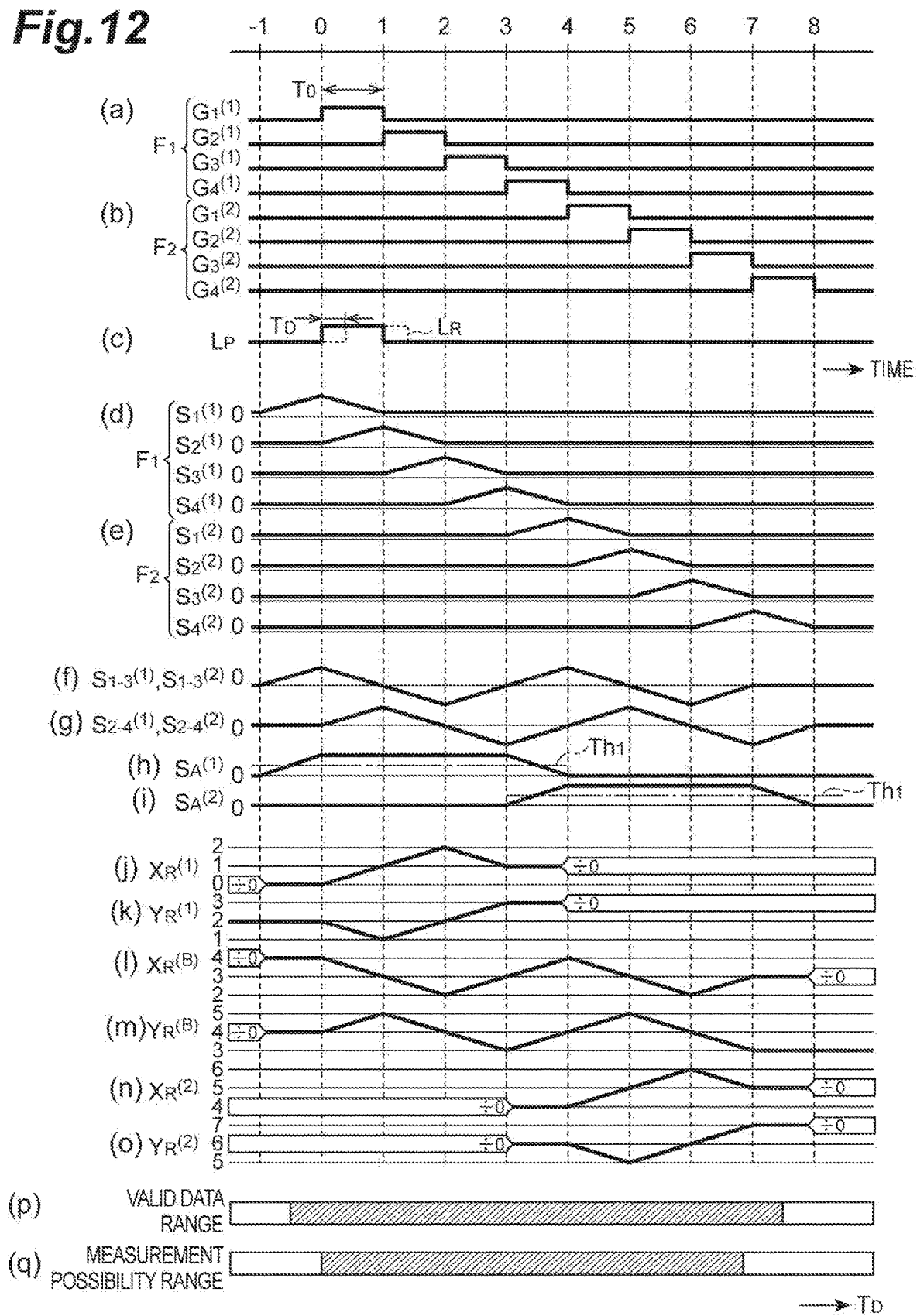
FIG. 12 is a graph showing a timing chart of various signals that are handled in a modification example and changes in various values calculated in the modification example with respect to a delay time $T_D$.

FIG. 12 is a graph showing a timing chart of various signals that are handled in the modification example and changes in various calculated values with respect to the delay time $T_D$. In FIG. 12, timings of control pulses $G_1^{(1)}$ to $G_4^{(1)}$ applied in the subframe period $F_1$, control pulses $G_1^{(2)}$ to $G_4^{(2)}$ applied in the subframe period $F_2$, and the pulsed light $L_P$ are illustrated in parts (a) to (c), and values of first to fourth detection signals $S_1^{(1)}$ to $S_4^{(1)}$ and $S_1^{(2)}$ to $S_4^{(2)}$ detected in the subframe periods $F_1$ and $F_2$ are illustrated in parts (d) to (e). Further, in FIG. 12, values of difference values $S_{1-3}^{(1)}$, $S_{1-3}^{(2)}$, $S_{2-4}^{(1)}$, and $S_{2-4}^{(2)}$ are illustrated in parts (f) to (g), values of distance data validity determination signals $S_A^{(1)}$ and $S_A^{(2)}$ are illustrated in parts (h) to (i), values of the distance calculation reference signals $X_R^{(1)}$, $Y_R^{(1)}$, $X_R^{(B)}$, $Y_R^{(B)}$, $X_R^{(2)}$, and $Y_R^{(2)}$ are illustrated in correspondence to the delay time $T_D$ in parts (j) to (o), a valid data range in the delay time $T_D$ is illustrated in part (p), and the measurement possibility range in the delay time $T_D$ is illustrated in part (q).

The computation circuit 12 according to the modification example calculates the difference values $S_{1-3}^{(1)}$, $S_{1-3}^{(2)}$, $S_{2-4}^{(1)}$, and $S_{2-4}^{(2)}$ on the basis of the detection signals $S_1^{(1)}$ to $S_4^{(1)}$ and $S_1^{(2)}$ to $S_4^{(2)}$ detected in the respective subframe periods $F_1$ and $F_2$, as in the above-described embodiment. The computation circuit 12 calculates the values of the distance data validity determination signals $S_A^{(1)}$ and $S_A^{(2)}$ corresponding to the respective subframe periods $F_1$ and $F_2$ on the basis of the difference values, as in the above-described embodiment. The values of the respective distance data validity determination signals $S_A^{(1)}$ and $S_A^{(2)}$ are compared with the threshold value $Th_1$, and it is determined whether or not the calculation of the distance using the detection signals $S_1^{(1)}$ to $S_4^{(1)}$ and $S_1^{(2)}$ to $S_4^{(2)}$ is valid. For example, by setting the threshold value $Th_1$ to about "0", it is determined that a range from a value between "−1" and "0" to a value between "7" and "8" of the delay time $T_D$ is the "valid data range" in which the calculation of the distance is valid, as illustrated in a part (p) of FIG. 12.

Further, the values of the first distance calculation reference signal $X_R^{(1)}$ and the second distance calculation reference signal $Y_R^{(1)}$ are calculated in correspondence to the subframe period $F_1$, as in the above-described embodiment. In addition, in the modification example, the values of the distance calculation reference signals $X_R^{(B)}$ and $Y_R^{(B)}$ are calculated using Equations (10) and (11) below on the basis of the detection signals detected over the two subframe periods $F_1$ and $F_2$.

$$X_R^{(B)}=3+(S_{1-3}^{(1)}+S_{1-3}^{(2)})/(S_A^{(1)}+S_A^{(2)}) \qquad (10)$$

$$Y_R^{(B)}=4+(S_{2-4}^{(1)}+S_{2-4}^{(2)})/(S_A^{(1)}+S_A^{(2)}) \qquad (11)$$

Further, the values of the first distance calculation reference signal $X_R^{(2)}$ and the second distance calculation reference signal $Y_R^{(2)}$ are calculated using Equations (12) and (13) below in correspondence to the subframe period $F_2$.

$$X_R^{(2)}=5-S_{1-3}^{(2)}/S_A^{(2)} \qquad (12)$$

$$Y_R^{(2)}=6-S_{2-4}^{(2)}/S_A^{(2)} \qquad (13)$$

Next, the computation circuit 12 according to the modification example selects the value to be referred to for distance calculation from among the distance calculation reference signals $X_R^{(1)}$, $X_R^{(B)}$, and $X_R^{(2)}$ and the distance calculation reference signal $Y_R^{(1)}$, $Y_R^{(B)}$ and $Y_R^{(2)}$. For example, when the value of the distance data validity determination signal $S_A^{(1)}$ is equal to or greater than the threshold value $Th_1$, the computation circuit 12 selects any one of the distance calculation reference signals $X_R^{(1)}$ and $Y_R^{(B)}$ according to the values of the distance calculation reference signals $X_R^{(1)}$ and $Y_R^{(1)}$, as in the above embodiment. When the value of the distance data validity determination signal $S_A^{(2)}$ is equal to or greater than the threshold value $Th_1$, the computation circuit 12 selects any one of the distance calculation reference signals $X_R^{(2)}$ and $Y_R^{(2)}$ according to the values of the distance calculation reference signals $X_R^{(2)}$ and $Y_R^{(2)}$, as in the above embodiment. Further, when the value of any one of the distance data validity determination signals $S_A^{(1)}$ and $S_A^{(2)}$ is equal to or greater than the threshold value $Th_1$, and when none of the distance calculation reference signals $X_R^{(1)}$ and $X_R^{(2)}$ and the distance calculation reference signals $Y_R^{(1)}$ and $Y_R^{(2)}$ has been selected, the computation circuit 12 selects any one of the distance calculation reference signals $X_R^{(B)}$ and $Y_R^{(B)}$ according to the values of the distance calculation reference signals $X_R^{(B)}$ and $Y_R^{(B)}$.

Lastly, when the range is determined to be within the "valid data range" and the target S is determined to be within the "measurement possibility range", the computation circuit 12 according to the modification example calculates the distance to the target S on the basis of the distance calculation reference signals $X_R^{(1)}$, $X_R^{(B)}$, $X_R^{(2)}$, $Y_R^{(1)}$, $Y_R^{(B)}$, and $Y_R^{(2)}$ selected regarding the pixel, averages calculation results in all of the subframe periods $F_1$ to $F_4$ to calculate distance information, and generates and outputs a distance image including the calculated distance information of each pixel.

According to the procedure described above, since the amount of charge generated by the incident pulsed light $L_R$ can be distributed to 4×4=16 time windows corresponding to the detection signals $S_1$ to $S_4$ in the four types of subframe periods $F_1$ to $F_4$, it is possible to widen a range in which calculation corresponding to the delay time $T_D$ is possible and also to reduce a time width of the time window. Further, since a value changing linearly with respect to the delay time $T_D$ is selected from among the distance calculation reference signals $X_R^{(1)}$, $X_R^{(B)}$, $X_R^{(2)}$, $Y_R^{(1)}$, $Y_R^{(B)}$, and $Y_R^{(2)}$ and the calculation of the distance is performed, it is possible to calculate a distance in a continuous range using a value of an appropriate distance data reference signal in correspondence to a range in which the target S is located, and to generate a highly accurate image signal regardless of the position of the target S. For example, when four time windows are set in one subframe period and the distance calculation is performed in every three subframe periods, the distance can be obtained through simple calculation when the incident pulsed light $L_R$ has been incident in 11 time windows. Similarly, when N types of subframe periods in which M time windows have been set are set, the distance can be calculated on the assumption that the incident pulsed light $L_R$ has been incident in correspondence to M×N−1 continuous time windows.

Further, a configuration in which at least the number of applications of the control pulse $G_1$ among the first to fourth control pulses $G_1$ to $G_4$ is changed among the four types of subframe periods $F_1$ to $F_4$ may be adopted in the above-described embodiment. Details of the control of the application timings of the control pulses $G_1$ to $G_4$ in the charge transfer control means 32 of the computation circuit 12 in the modification example of such an aspect will be described with reference to FIG. 13.

Figure 13:
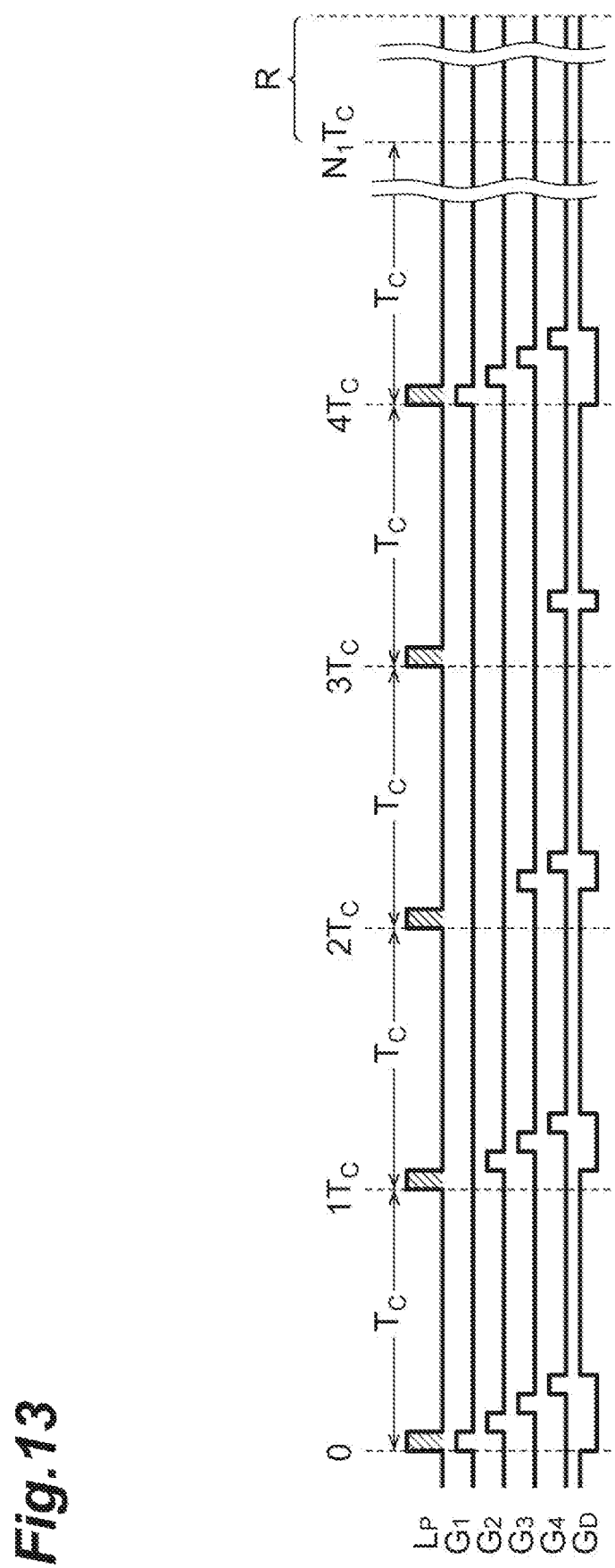
FIG. 13 is a timing chart illustrating control timings of the pulsed light $L_P$ and the first to fourth control pulses $G_1$ to $G_4$ in the subframe period $F_1$ in the modification example.

FIG. 13 is a timing chart illustrating control timings of the pulsed light $L_P$ and the first to fourth control pulses $G_1$ to $G_4$ in the subframe period $F_1$ in the modification example. Although FIG. 13 illustrates the timing control in the subframe period $F_1$, the timing control in the other subframe periods $F_2$ to $F_4$ may be the same as a control state illustrated in FIG. 3 or 4.

That is, in the charge transfer control means 32 of the modification example, application timings of the first to fourth control pulses $G_1$ to $G_4$ are controlled so that rates of the number of applications (the number of applications per unit time) of the sequentially applied first to fourth control pulses $G_1$ to $G_4$ decrease in an order of the fourth to first control pulses $G_4$ to $G_1$ in the subframe periods $F_1$ to $F_4$ in which the delay time of the first to fourth control pulses $G_1$ to $G_4$ with respect to the application timing of the pulsed light $L_P$ is short. However, a rate of the number of applications of at least the first control pulse $G_1$ may decrease. That is, in the example illustrated in FIG. 13, the charge transfer control means 32 performs control so that the number of applications of the control pulses $G_1$ to $G_3$ is thinned out in the subframe period $F_1$ with the shortest delay time, and performs controls so that the number of times of tinning-out within the subframe period $F_1$ increases in an order of the third to first control pulses $G_3$ to $G_1$. More specifically, the charge transfer control means 32 performs control so that the numbers of applications of the first to fourth control pulses $G_1$ to $G_4$ within the subframe period $F_1$ are N1·(¼), N1·(2/4), N1·(¾), and N1, respectively.

Figure 14:
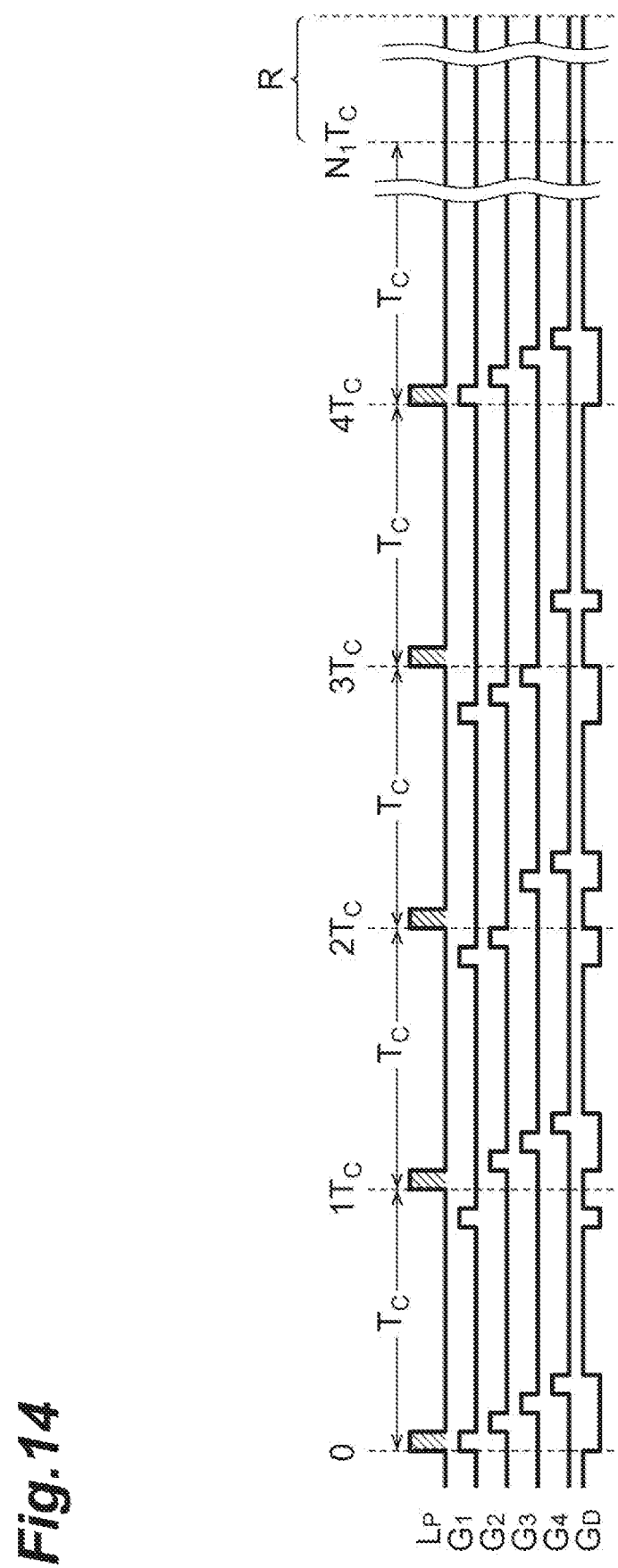
FIG. 14 is a timing chart illustrating control timings of the pulsed light $L_P$ and the first to fourth control pulses $G_1$ to $G_4$ in the subframe period $F_1$ in the modification example.

Further, in the modification example, the control timings of the pulsed light $L_P$ and the first to fourth control pulses $G_1$ to $G_4$ in the subframe period $F_1$ may be controlled as illustrated in FIG. 14.

That is, in the charge transfer control means 32 of the modification example, the application timings of the first to fourth control pulses $G_1$ to $G_4$ are controlled so that rates of the number of applications of the first to fourth control pulses $G_1$ to $G_4$ having a delay time corresponding to a distance range of a measurement target, which are applied immediately after the application of the pulsed light $L_P$, decrease in the order of the fourth to first control pulses $G_4$ to $G_1$ in the subframe periods $F_1$ to $F_4$ in which the delay time of the first to fourth control pulses $G_1$ to $G_4$ with respect to the application timing of the pulsed light $L_P$ is short. However, at least the rate of the number of applications of the first control pulse $G_1$ may decrease. That is, in the example illustrated in FIG. 14, the charge transfer control means 32 performs control so that some of the control pulses $G_1$ to $G_3$ is changed to a timing of a delay time that does not correspond to a distance range of a measurement target immediately before the application of the pulsed light $L_P$ in the subframe period $F_1$ having the shortest delay time, and performs control so that the number of times the application timing is changed within the subframe period $F_1$ increases in an order of the third to first control pulses $G_3$ to $G_1$. Only the background light is reflected in the detection signal due to application of the control pulses $G_3$ to $G_1$ of which the application timings have been changed as described above. More specifically, the numbers of applications of the first to fourth control pulses $G_1$ to $G_4$ applied immediately after the application of the pulsed light $L_P$ in the subframe period $F_1$ are controlled to be N1·(¼), N1·(2/4), N1·(¾), and N1.

According to the above-described modification example, it is possible to prevent the saturation of the detection signal when the target S within a near distance measurement range is targeted, and as a result, to improve the dynamic range of the distance measurement. That is, when the target S in a near distance region is targeted, the number of generated electrons becomes very large due to the strong incident pulsed light $L_R$, and is likely to exceed the number of saturated electrons in the pixel circuit 13. In the modification example, in the subframe period in which the time window for measurement in the near distance region is set, the number of times of charge capturing in the time window is reduced and the number of generated electrons is curbed. As a result, it is possible to keep the number of generated electrons in the pixel circuit 13 within a range of the number of saturated electrons, and to keep the distance resolution when the target S in the near distance region is targeted at a sufficient value while sufficiently increasing the distance resolution when the target S in the far distance region is targeted.

Figure 15:
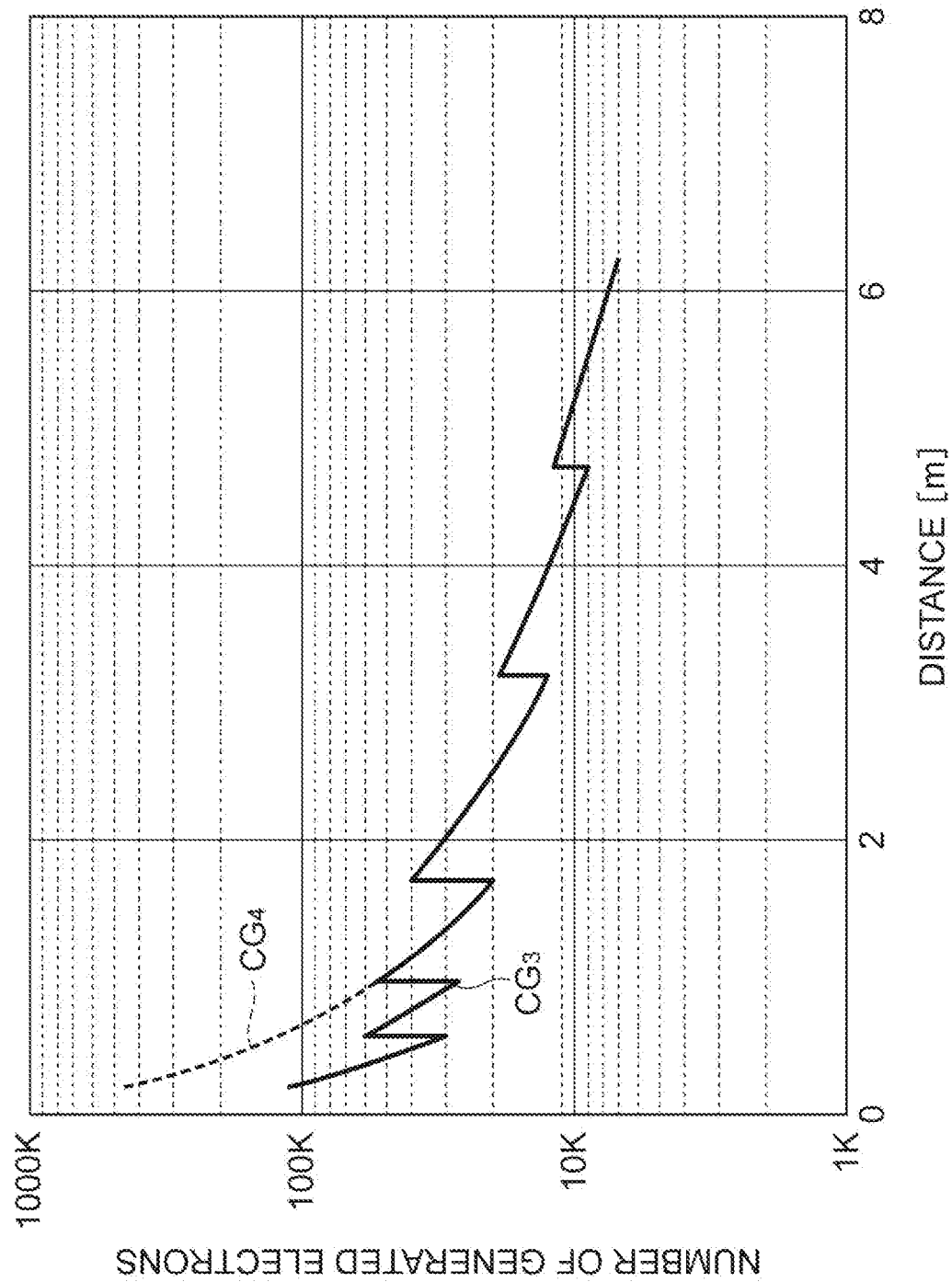
FIG. 15 is a graph illustrating simulation results of the number of generated electrons at the time of signal readout in a modification example when distance measurement is performed in a distance range from 0.2 to 6 m.

FIG. 15 illustrates simulation results of the number of generated electrons in each signal readout of the modification example when the distance measurement is performed in a distance range from 0.2 to 6 m under background light of 0 lux. A graph $CG_3$ shows the number of generated electrons in one frame period when the number of applications of the first control pulse $G_1$ is thinned out to ¼ in the subframe period $F_1$ and the number of applications of the second control pulse $G_2$ is thinned out to ⅔. Further, a graph $CG_4$ shows the number of generated electrons in one frame period when the first to fourth control pulses $G_1$ to $G_4$ are not thinned out. As shown in these results, the number of generated electrons in the signal readout in a short measurement range up to a distance of about 1 m is curbed in the modification example.

Figure 16:
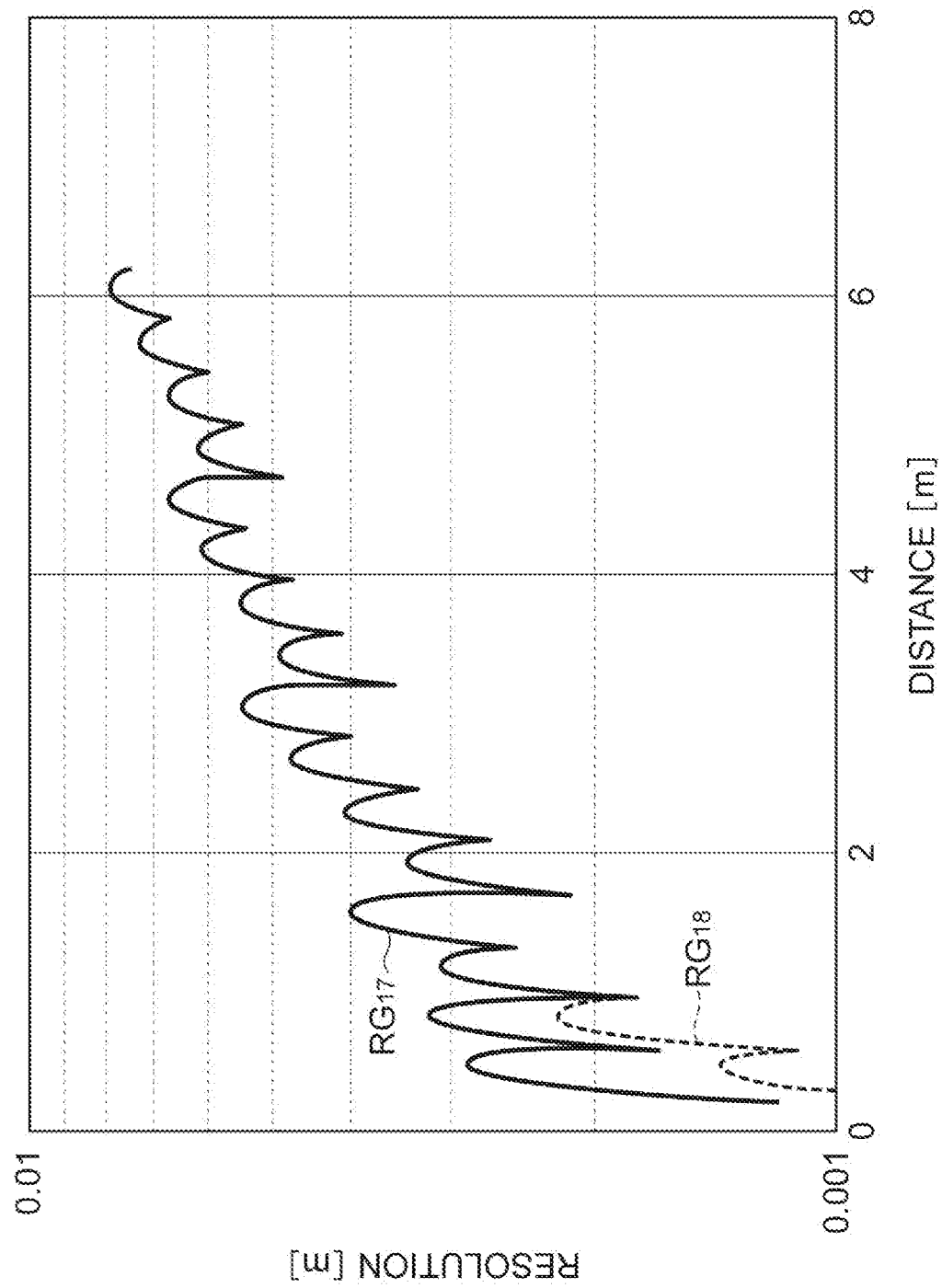
FIG. 16 is a graph illustrating simulation results of a distance resolution in a modification example when distance measurement is performed in a distance range from 0.2 to 6 m.

Further, FIG. 16 illustrates simulation results of the distance resolution in the modification example when the distance measurement has been performed in a distance range from 0.2 to 6 m under background light of 0 lux. A graph $RG_{17}$ shows a distance resolution when the number of applications of the first control pulse $G_1$ is thinned out to ¼ and the number of applications of the second control pulse $G_2$ is thinned out to ⅔ in the subframe period $F_1$. Further, a graph $RG_{18}$ shows a distance resolution when the first to fourth control pulses $G_1$ to $G_4$ are not thinned out. As shown in the graph $RG_{17}$, even when the control pulses are thinned out, the distance resolution is curbed to about 3.2 mm or less at a distance of 0.8 m in the modification example.

Further, in the above-described embodiment, the length of each of the subframe periods $F_1$ to $F_4$ is set to be longer as the delay time of each of the control pulses $G_1$ to $G_4$ with respect to the generation timing of the pulsed light $L_P$ increases. Instead, as a modification example, the intensity of the pulsed light $L_P$ in each of the subframe periods $F_1$ to $F_4$ in one frame period may be set with a weight to be weaker as the delay time of each of the control pulses $G_1$ to $G_4$ with respect to the generation timing of the pulsed light $L_P$ becomes shorter.

Figure 17:
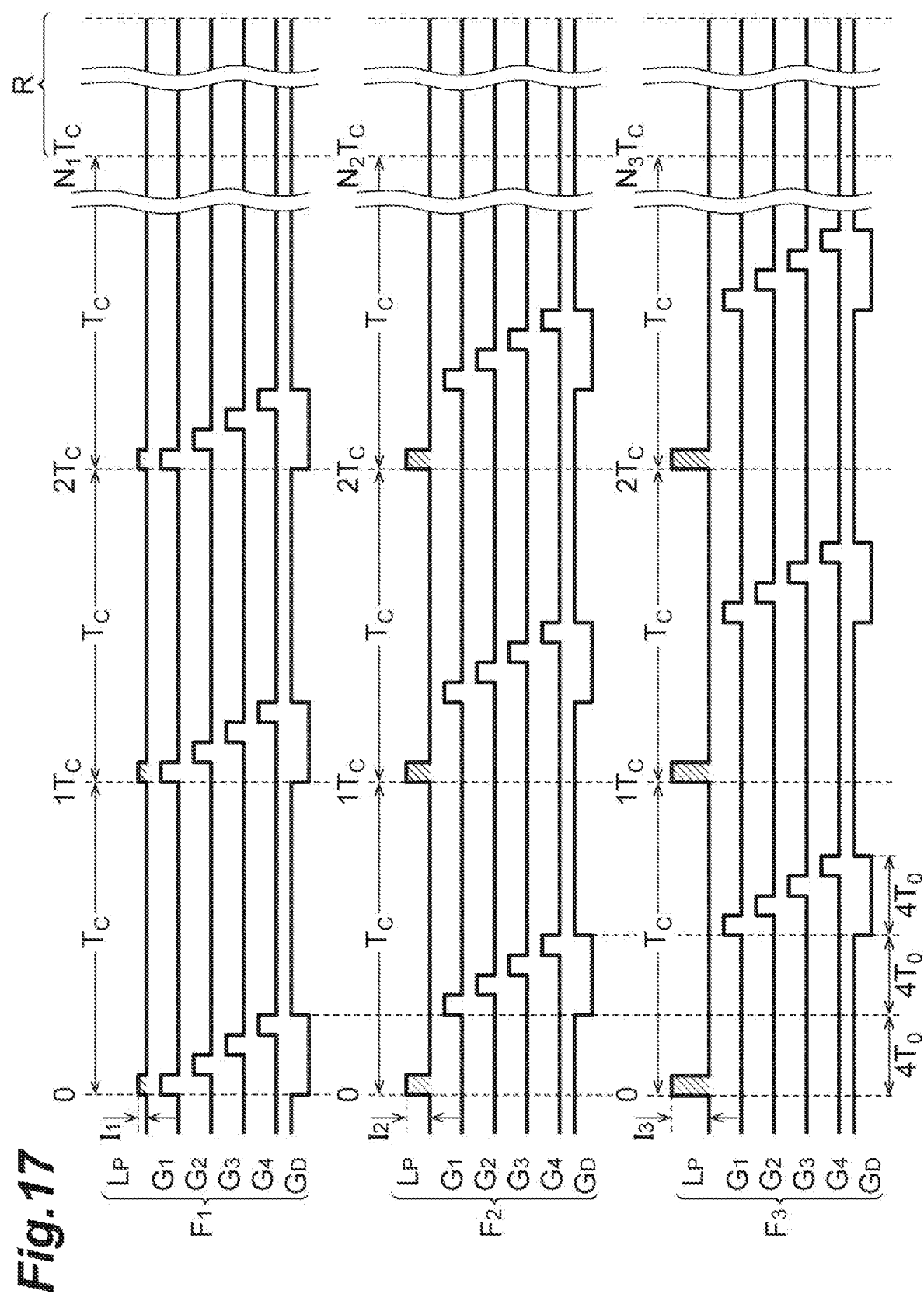
FIG. 17 is a timing chart illustrating application timings of control pulses $G_1$ to $G_4$ and a generation timing of pulsed light $L_P$ in a computation circuit 12 in a modification example.

FIG. 17 illustrates application timings of the control pulses $G_1$ to $G_4$ and generation timing of the pulsed light $L_P$ in the charge transfer control means 32 and the light source control means 31 of the computation circuit 12 in a modification example of such an aspect. In the modification example, intensities of the pulsed light $L_P$ generated in each of the subframe periods $F_1$ to $F_3$ are set to $I_1$, $I_2$, and $I_3$ ($I_1<I_2<I_3$) by the light source control means 31 of the computation circuit 12. Specifically, when it can be assumed that the light source 11 is a point light source, the reflected light of the pulsed light $L_P$ attenuates in inverse proportion to the square of the distance, and thus, the intensities are set according to weighting as shown in the following equation:

$I_1:I_2:I_3=(⅓)^2:(⅔)^2:1=1:4:9$

The intensity of the pulsed light $L_P$ in the subframe period $F_4$ is set in a similar manner. In this case, the numbers $N_1$ to $N_4$ of repetitions of the pulsed light $L_P$ in each of the subframe periods $F_1$ to $F_4$ is set to be equal to one another.

According to such a modification example, it is also possible to increase projection intensity of the light pulse for a frame in a far distance measurement range according to the distance measurement range in each of the subframe periods $F_1$ to $F_4$ and decrease the projection intensity for a frame in a near distance measurement range, and to increase the distance resolution. In particular, since the intensity of the incident pulsed light $L_R$ decreases in inverse proportion to the square of the distance, the intensity of the light pulse is weighted by a square of the measured distance. Thereby, it is possible to use stronger pulsed light for the subframe period with the longest measured distance at which the distance resolution is the lowest, and to improve the minimum value of the distance resolution (which can be caused in the subframe period with the longest measurement distance). As a result, it is possible to prevent a decrease in the distance resolution in a far distance measurement range and to efficiently maintain the distance resolution as a whole.

Further, as another modification example, control may be performed so that capacitances of the charge readout regions $22_1$ to $22_4$ become larger as the delay time of the control pulses $G_1$ to $G_4$ with respect to the generation timing of the pulsed light $L_P$ decreases in each of the subframe periods $F_1$ to $F_4$ in one frame period.

Figure 18:
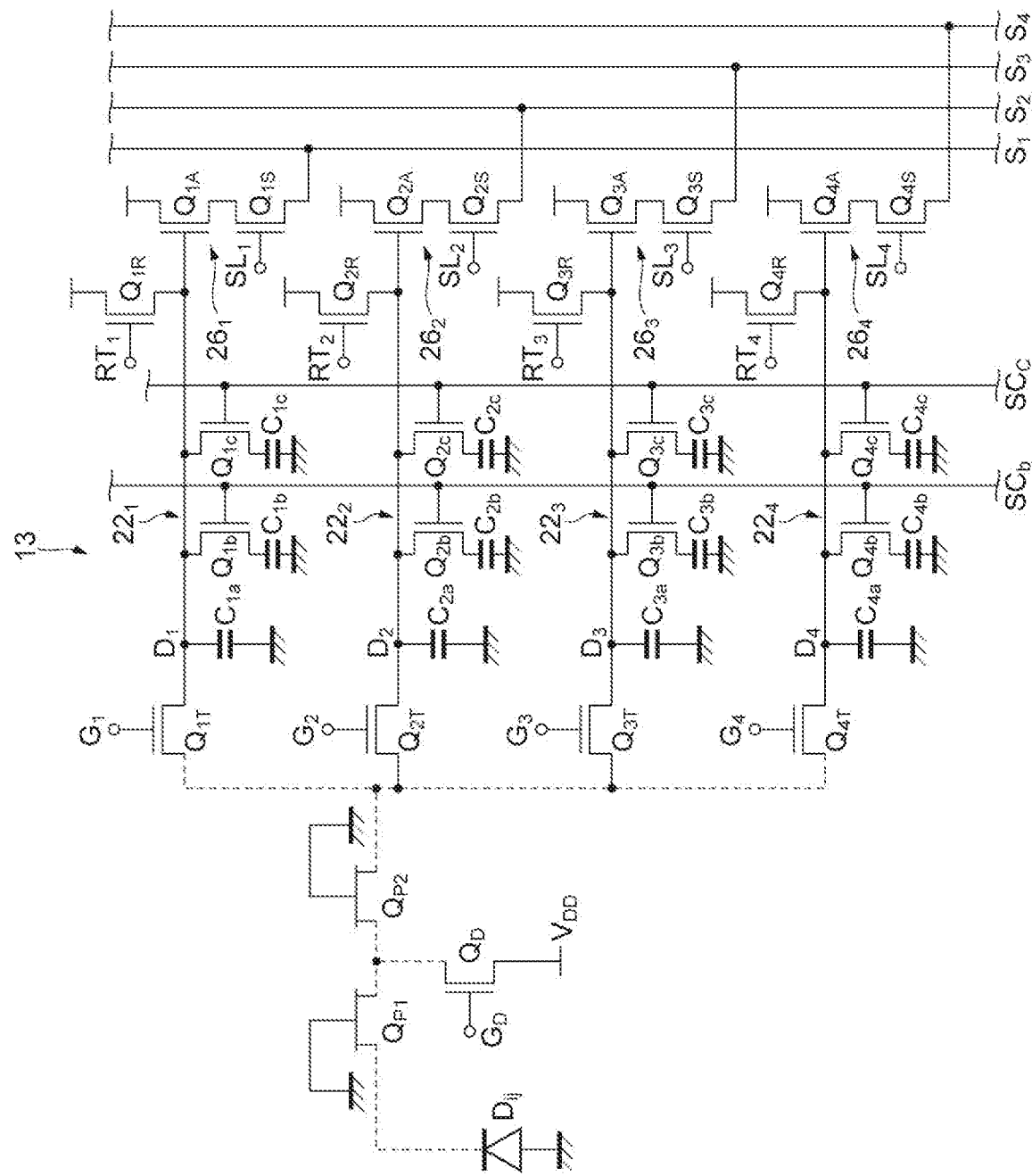
FIG. 18 is an equivalent circuit diagram of main units of a pixel circuit 13 in a modification example.

FIG. 18 illustrates an equivalent circuit diagram of main units of the pixel circuit 13 in a modification example with such an aspect. In FIG. 18, a photodiode $D_{ij}$ corresponds to the photoelectric conversion region 21, a gate terminal of a charge discharging MOS transistor $Q_D$ corresponds to the fifth control electrode 25, and respective gate terminals of transfer MOS transistors $Q_{1T}$ to $Q_{4T}$ correspond to the first to fourth control electrodes $24_1$ to $24_4$. An electrostatic induction channel portion from the photodiode $D_{ij}$ to the transfer MOS transistors $Q_{1T}$ to $Q_{4T}$ is represented by junction field effect transistors $Q_{P1}$ and $Q_{P2}$ having grounded gate terminals. A source terminal of the charge discharging MOS transistor $Q_D$ is connected to an intermediate tap between the two junction field effect transistors $Q_{P1}$ and $QP_2$ connected in series, and a drain terminal of the charge discharging MOS transistor $Q_D$ is connected to a high potential power supply $V_{DD}$. In the equivalent circuit, a configuration in which one end of each of the transfer MOS transistors $Q_{1T}$ to $Q_{4T}$ is connected to the junction field effect transistor $Q_{P2}$ in a T-shape is represented.

Further, as illustrated in FIG. 18, the charge readout regions $22_1$ to $22_4$ and the voltage detection means $26_1$ to $26_4$ are connected to respective other ends of the transfer MOS transistors $Q_{1T}$ to $Q_{4T}$. On the equivalent circuit, a charge readout region $22_k$ (k=1, 2, 3, 4) is represented by a node $D_k$, capacitors (capacitance elements) $C_{ka}$, $C_{kb}$, and $C_{kc}$, and capacitance switching MOS transistors $Q_{kb}$ and $Q_{kc}$. A voltage detecting means $26_k$ (k=1, 2, 3, 4) is represented by MOS transistors $Q_{kA}$ and $Q_{kS}$ and a terminal $SL_k$.

In the charge readout region $22_k$, the charge storage capacitor $C_{ka}$ is connected between the node $D_k$ and the ground, and a series circuit of the capacitance switching MOS transistor $Q_{kb}$ and the charge storage capacitor $C_{kb}$, and a series circuit of the capacitance switching MOS transistor $Q_{kc}$ and the charge storage capacitor $C_{kc}$ are connected in parallel therewith. Four gate terminals of the capacitance switching MOS transistor $Q_{kb}$ are connected to a control line $SC_b$, four gate terminals of the capacitance switching MOS transistor $Q_{kc}$ are connected to a control line $SC_c$, and ON/OFF of the capacitance switching MOS transistor $Q_{kb}$ and the capacitance switching MOS transistor $Q_{kc}$ can be independently controlled using control signals given from the charge transfer control means 32 of the computation circuit 12 to the control line $SC_b$ and the control line $SC_c$. As a result, the charge transfer control means 32 can control capacitances of the charge readout regions $22_1$ to $22_4$ so that the capacitances change in four ways.

A gate terminal of an amplification transistor $Q_{kA}$ constituting a source follower circuit for reading out a potential change according to a change in the amount of charge of the node $D_k$ is connected to the node $D_k$, and a reset transistor $Q_{kR}$ for initializing signal charge after signal readout is also connected to the node $D_k$. Further, a selection transistor $Q_{kS}$ as a switch for readout pixel selection is connected to a source terminal of the amplification transistor $Q_{kA}$, and an output of the selection transistor $Q_{kS}$ is connected to a signal readout line $S_k$ for reading out the detection signal.

In such a modification example, when the charge transfer control means 32 of the computation circuit 12 transfers the charge and reads out the detection signal in each of the subframe periods $F_1$ to $F_4$, capacitances of the charge readout regions $22_1$ to $22_3$ are set to $C_1$, $C_2$, and $C_3$ ($C_1 > C_2 > C_3$), respectively. Specifically, when it can be assumed that the light source 11 is a point light source, the reflected light of the pulsed light $L_P$ attenuates in inverse proportion to a square of the distance, and thus, the capacitances are set according to weighting as shown in the following equation:

$$C_1 : C_2 : C_3 = 1 : (2/3)^2 : (1/3)^2 = 9 : 4 : 1$$

For example, such weighting is realized by performing control such that $C_{ka} : C_{kb} : C_{kc} = 1 : 3 : 5$, $C_1 = C_{ka} + C_{kb} + C_{kc}$, $C_2 = C_{ka} + C_{kb}$, and $C_3 = C_{ka}$.

The capacitance of the charge readout region $22_4$ is also set in the same manner. In this case, the numbers $N_1$ to $N_4$ of repetitions of the pulsed light $L_P$ in each of the subframe periods $F_1$ to $F_4$ is set to be equal to one another.

According to such a modification example, it is also possible to decrease a capacitance for charge accumulation for frames in a far distance measurement range according to the distance measurement range in each of the subframe periods $F_1$ to $F_4$ and increase a capacitance for charge accumulation for frames in a near distance measurement range, and to increase the distance resolution. In particular, since the intensity of the incident pulsed light $L_R$ decreases in inverse proportion to the square of the distance, it is possible to use a smaller capacitance for the subframe period of the longest measured distance at which the distance resolution is the lowest and to improve the minimum value of the distance resolution (which can be caused in the subframe period with the longest measurement distance). As a result, it is possible to prevent a decrease in the distance resolution in a far distance measurement range and to efficiently maintain the distance resolution as a whole.

Here, in the above embodiment, the distance calculation means may calculate the distance using the first to M-th detection signals detected according to the application of the first to M-th control pulses in each of the first to N-th subframe periods. In this case, it is possible to calculate a distance having a high distance resolution according to the distance measurement range of the target.

Further, the distance calculation means may calculate the distance using the first to M-th detection signals detected according to the application of the first to M-th control pulses in two of the first to N-th subframe periods. In this case, it is possible to calculate a continuous distance in a plurality of distance measurement ranges of the target.

Further, the number of repetitions of the pulsed light in the respective first to N-th (N is an integer equal to or greater than 2) subframe periods in one frame period may be weighted to increase as a delay time of the first to M-th control pulses with respect to the generation timing of the pulsed light increases. As a result, it is possible to prevent a decrease in the distance resolution in a far distance measurement range and to efficiently maintain the distance resolution as a whole.

Further, the voltage detection means may read out the voltages of the respective first to M-th charge readout regions generated according to the application of the first to M-th control pulses in each subframe period of the period set with a weight, as the first to M-th detection signals. In this case, it is possible to prevent saturation of the detection signal caused by strong background light, and as a result, to improve the dynamic range of the distance measurement.

Still further, the charge transfer control means may perform a setting so that the rate of the number of applications of at least the first control pulse among the sequentially applied first to M-th control pulses decreases as the delay time of the first to M-th control pulses with respect to the generation timing of the pulsed light becomes shorter during the first to N-th subframe periods. With this configuration, it is possible to prevent the detection signal from being saturated when the target within a near distance measurement range is targeted, and as a result, to improve the dynamic range of the distance measurement.

Still further, the charge transfer control means may perform a setting so that the number of applications of at least the first control pulse among the sequentially applied first to M-th control pulses is thinned out as the delay time of the first to M-th control pulses with respect to the generation timing of the pulsed light becomes shorter during the first to N-th subframe periods. With this configuration, it is possible to prevent the detection signal from being saturated when the target within a near distance measurement range is targeted, and as a result, to improve the dynamic range of the distance measurement.

Further, the intensity of the pulsed light in each of the first to N-th subframe periods in the one frame period may be weighted to decrease as the delay time of the first to M-th control pulses with respect to the generation timing of the pulsed light becomes shorter. In this case, it is possible to prevent the detection signal from being saturated when the target within a near distance measurement range is targeted, and as a result, to improve the dynamic range of the distance measurement.

Further, control may be performed so that a capacitance of the first to M-th charge readout regions increases as the delay time of the first to M-th control pulses with respect to the generation timing of the pulsed light becomes shorter in each of the first to N-th subframe periods in the one frame period. In this case, it is possible to prevent the detection signal from being saturated when the target within a near distance measurement range is targeted, and as a result, to improve the dynamic range of the distance measurement.

Further, the pixel circuit unit may include image sensors arranged in a two-dimensional array. With this configuration, it is possible to generate a distance image including highly accurate two-dimensional distance information regardless of the position of the target.

INDUSTRIAL APPLICABILITY

According to an aspect of the present invention, the distance image measurement device and the distance image measurement method for generating the distance image including the distance information for each pixel are adopted as a use purpose, thereby generating an image signal with an improved distance resolution for a target in various distance measurement ranges.

REFERENCE SIGNS LIST

10: Distance image sensor (distance image measurement device)
11: Light source
12: Computation circuit
13: Pixel circuit (pixel circuit part)
21: Photoelectric conversion region
$22_1$ to $22_4$: Charge readout region
23: Charge discharge region
$24_1$ to $24_4$, 25: Control electrode
$26_1$ to $26_4$: Voltage detection means
31: Light source control means
32: Charge transfer control means
33: Distance data validity determination signal generation means
34: Distance data validity determination means
35: Invalid pixel identification value generation means
36: Distance calculation reference signal generation means
37: Distance calculation reference signal selection means
38: Distance image generation means
$F_1$ to $F_4$: Subframe period
$G_1$ to $G_4$, $G_D$: Control pulse
$L_P$: Pulsed light
S: Target

The invention claimed is:

1. A distance image measurement device comprising:
a light source configured to generate pulsed light;
a light source controller configured to control the light source so that the light source regularly and repeatedly generates the pulsed light with a first duration in first to N-th (N is an integer equal to or greater than 2) subframe periods included in one frame period;
a pixel circuit part including a photoelectric conversion region configured to convert light into charge, first to M-th (M is an integer equal to or greater than 2) charge readout regions provided in proximity to the photoelectric conversion region and apart from each other, a charge discharge region for discharging the charge, and first to (M+1)-th control electrodes provided in correspondence to the photoelectric conversion region, the first to M-th charge readout regions, and the charge discharge region, for applying first to (M+1)-th control pulses for charge transfer between the photoelectric conversion region and the first to M-th charge readout regions, and charge transfer between the photoelectric conversion region and the charge discharge region, respectively;
a charge transfer controller configured to sequentially apply the first to M-th control pulses to the first to M-th control electrodes during a second duration, the second duration being equal to or longer than the first duration, in correspondence to the generation of the pulsed light by the light source controller, and apply the (M+1)-th control pulse to the (M+1)-th control electrode during a period other than application periods of the first to M-th control pulses;
a detector configured to read out voltages of the first to M-th charge readout regions of the pixel circuit part as first to M-th detection signals after the application of the first to M-th control pulses by the charge transfer controller; and
a calculator configured to repeatedly calculate a distance on the basis of the first to M-th detection signals,
wherein the charge transfer controller sets timings of the first to M-th control pulses so that delay times of the first to M-th control pulses with respect to a generation timing of the pulsed light are shifted to a time differing between first to N-th (N is an integer equal to or greater than 2) subframe periods in one frame period, and
the voltage detector reads out the voltages of the respective first to M-th charge readout regions generated according to the application of the first to M-th control pulses, as the first to M-th detection signals, in each subframe period of a period set with a weight.

2. The distance image measurement device according to claim 1, wherein the calculator calculates the distance using the first to M-th detection signals detected according to the application of the first to M-th control pulses in each of the first to N-th subframe periods.

3. The distance image measurement device according to claim 1, wherein the calculator calculates the distance using the first to M-th detection signals detected according to the application of the first to M-th control pulses in two of the first to N-th subframe periods.

4. The distance image measurement device according to claim 1, wherein the number of repetitions of the pulsed light in the respective first to N-th (N is an integer equal to or greater than 2) subframe periods in one frame period is weighted to increase as a delay time of the first to M-th control pulses with respect to the generation timing of the pulsed light increases.

5. The distance image measurement device according to claim 1, wherein the charge transfer controller performs a setting so that a rate of the number of applications of at least the first control pulse among the sequentially applied first to M-th control pulses decreases as a delay time of the first to M-th control pulses with respect to the generation timing of the pulsed light becomes shorter during the first to N-th subframe periods.

6. The distance image measurement device according to claim 5, wherein the charge transfer controller performs a setting so that the number of applications of at least the first control pulse among the sequentially applied first to M-th control pulses is thinned out as the delay time of the first to M-th control pulses with respect to the generation timing of the pulsed light becomes shorter during the first to N-th subframe periods.

7. The distance image measurement device according to claim 1, wherein the intensity of the pulsed light in each of the first to N-th subframe periods in the one frame period is weighted to decrease as the delay time of the first to M-th control pulses with respect to the generation timing of the pulsed light becomes shorter.

8. The distance image measurement device according to claim 1, wherein control is performed so that a capacitance of the first to M-th charge readout regions increases as the delay time of the first to M-th control pulses with respect to the generation timing of the pulsed light becomes shorter in each of the first to N-th subframe periods in the one frame period.

9. The distance image measurement device according to claim 1, further comprising:
an image sensor having the pixel circuit unit arranged in a two-dimensional array.

10. A distance image measurement method comprising:
a light source control step of controlling, by a light source controller, a light source so that the light source regularly and repeatedly generates pulsed light with a first duration in first to N-th (N is an integer equal to or greater than 2) subframe periods included in one frame period;
a charge transfer control step of sequentially applying, by a charge transfer controller, the first to M-th control pulses for controlling transfer of charge to the first to M-th control electrodes during a second duration, the second duration being equal to or longer than the first duration, in correspondence to the generation of the pulsed light by the light source controller, and applying an (M+1)-th control pulse for controlling discharge of the charge to the (M+1)-th control electrode during a period other than application periods of the first to M-th control pulses, by using a pixel circuit part including a photoelectric conversion region configured to convert light into charge, first to M-th (M is an integer equal to or greater than 2) charge readout regions provided in proximity to the photoelectric conversion region and apart from each other, a charge discharge region for discharging the charge, and first to (M+1)-th control electrodes provided in correspondence to the photoelectric conversion region, the first to M-th charge readout regions, and the charge discharge region;

a voltage detection step of reading out, by a detector, voltages of the first to M-th charge readout regions of the pixel circuit part as first to M-th detection signals after the application of the first to M-th control pulses by the charge transfer controller; and a distance calculation step of repeatedly calculating, by a calculator, a distance on the basis of the first to M-th detection signals, wherein the charge transfer control step includes setting timings of the first to M-th control pulses so that delay times of the first to M-th control pulses with respect to a generation timing of the pulsed light are shifted to a time differing between first to N-th (N is an integer equal to or greater than 2) subframe periods in one frame period, and the voltage detection step includes reading out the voltages of the respective first to M-th charge readout regions generated according to the application of the first to M-th control pulses, as the first to M-th detection signals, in each subframe period of a period set with a weight.

\* \* \* \* \*